US008626848B2

(12) United States Patent
Cohen et al.

(10) Patent No.: US 8,626,848 B2
(45) Date of Patent: Jan. 7, 2014

(54) OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 490 days.

(21) Appl. No.: 12/802,139

(22) Filed: May 27, 2010

(65) Prior Publication Data

US 2011/0004940 A1    Jan. 6, 2011

Related U.S. Application Data

(63) Continuation-in-part of application No. 12/799,794, filed on Apr. 29, 2010, which is a continuation-in-part of application No. 12/454,113, filed on May 12, 2009, which is a continuation-in-part of application No. 12/287,268, filed on Oct. 7, 2008, which is a continuation-in-part of application No. 12/228,873, filed on Aug. 15, 2008, which is a continuation-in-part of application No. 12/228,664, filed on Aug. 14, 2008.

(51) Int. Cl.
*G06F 15/16* (2006.01)
*H04M 1/56* (2006.01)
*H04M 15/06* (2006.01)
*G06Q 99/00* (2006.01)

(52) U.S. Cl.
USPC ...... 709/206; 709/245; 709/246; 379/142.02; 379/142.06; 379/142.14; 705/319

(58) Field of Classification Search
None
See application file for complete search history.

(56) References Cited

U.S. PATENT DOCUMENTS

| 3,985,972 A | 10/1976 | Rolin et al. |
|---|---|---|
| 4,218,738 A | 8/1980 | Matyas et al. |
| 5,493,692 A | 2/1996 | Theimer et al. |
| 5,508,699 A | 4/1996 | Silverman |
| 5,732,138 A | 3/1998 | Noll et al. |
| 5,751,806 A | 5/1998 | Ryan |
| 5,812,639 A | 9/1998 | Bartholomew et al. |

(Continued)

OTHER PUBLICATIONS

U.S. Appl. No. 12/927,966, Jung et al.

(Continued)

*Primary Examiner* — Azizul Choudhury

(57) ABSTRACT

A computationally implemented method includes, but is not limited to: receiving a first communiqué that is affiliated with a source entity and that is directed to a receiving entity; and transmitting to the receiving entity, in lieu of the first communiqué, a second communiqué that is provided in accordance with one or more conditional directives to conditionally obfuscate identity of the source entity, the one or more conditional directives provided by the receiving entity. In addition to the foregoing, other method aspects are described in the claims, drawings, and text forming a part of the present disclosure.

38 Claims, 21 Drawing Sheets

(56) References Cited

U.S. PATENT DOCUMENTS

| | | | |
|---|---|---|---|
| 5,835,856 A | 11/1998 | Patel | |
| 5,933,498 A | 8/1999 | Schneck et al. | |
| 6,005,926 A | 12/1999 | Mashinsky | |
| 6,026,291 A | 2/2000 | Carlsson et al. | |
| 6,199,102 B1 | 3/2001 | Cobb | |
| 6,224,109 B1 | 5/2001 | Yang | |
| 6,351,745 B1 | 2/2002 | Itakura et al. | |
| 6,396,531 B1 | 5/2002 | Gerszberg et al. | |
| 6,496,931 B1 | 12/2002 | Rajchel et al. | |
| 6,510,236 B1 | 1/2003 | Crane et al. | |
| 6,522,889 B1 | 2/2003 | Aarnio | |
| 6,529,592 B1 | 3/2003 | Khan | |
| 6,563,913 B1 | 5/2003 | Kaghazian | |
| 6,591,291 B1 | 7/2003 | Gabber et al. | |
| 6,738,808 B1 | 5/2004 | Zellner et al. | |
| 6,816,885 B1 | 11/2004 | Raghunandan | |
| 6,857,021 B1 | 2/2005 | Schuster et al. | |
| 6,918,039 B1 | 7/2005 | Hind et al. | |
| 6,937,730 B1 | 8/2005 | Buxton | |
| 6,985,569 B2 | 1/2006 | Baker | |
| 6,990,590 B2 * | 1/2006 | Hanson et al. | 713/194 |
| 7,007,025 B1 | 2/2006 | Nason et al. | |
| 7,133,837 B1 | 11/2006 | Barnes, Jr. | |
| 7,159,011 B1 | 1/2007 | Knight et al. | |
| 7,203,315 B1 | 4/2007 | Livesay | |
| 7,225,342 B2 | 5/2007 | Takao et al. | |
| 7,248,885 B2 | 7/2007 | Benco et al. | |
| 7,275,090 B2 | 9/2007 | Oeda et al. | |
| 7,308,251 B2 | 12/2007 | Karaoguz | |
| 7,310,816 B1 | 12/2007 | Burns et al. | |
| 7,327,312 B1 | 2/2008 | Harris | |
| 7,334,267 B2 | 2/2008 | Engstrom | |
| 7,363,024 B2 | 4/2008 | Jenkins | |
| 7,382,881 B2 | 6/2008 | Uusitalo et al. | |
| 7,389,541 B2 | 6/2008 | Jia et al. | |
| 7,400,878 B2 | 7/2008 | Hassan et al. | |
| 7,401,159 B1 | 7/2008 | Aviani et al. | |
| 7,458,095 B2 | 11/2008 | Forsberg | |
| 7,567,936 B1 | 7/2009 | Peckover et al. | |
| 7,614,081 B2 | 11/2009 | Prohel et al. | |
| 7,616,943 B2 | 11/2009 | Oesterling | |
| 7,623,639 B2 | 11/2009 | Thai et al. | |
| 7,627,334 B2 | 12/2009 | Cohen et al. | |
| 7,630,495 B2 | 12/2009 | Kiiveri et al. | |
| 7,634,295 B2 | 12/2009 | Hayaashi et al. | |
| 7,643,484 B2 | 1/2010 | Willman et al. | |
| 7,724,918 B2 | 5/2010 | Balakrishnan et al. | |
| 7,783,741 B2 | 8/2010 | Hardt | |
| 7,787,870 B2 | 8/2010 | Burgan et al. | |
| 7,797,024 B2 | 9/2010 | Sutardja | |
| 7,814,017 B2 | 10/2010 | Vancini et al. | |
| 7,920,050 B2 | 4/2011 | Juels et al. | |
| 7,921,052 B2 | 4/2011 | Dabney et al. | |
| 7,966,664 B2 | 6/2011 | Makkinejad | |
| 8,140,062 B1 | 3/2012 | Hildner et al. | |
| 8,190,128 B1 | 5/2012 | Lundy et al. | |
| 2001/0023432 A1 | 9/2001 | Council et al. | |
| 2001/0031631 A1 | 10/2001 | Pitts | |
| 2001/0034677 A1 | 10/2001 | Farhat et al. | |
| 2001/0034723 A1 * | 10/2001 | Subramaniam | 705/74 |
| 2001/0036822 A1 | 11/2001 | Mead et al. | |
| 2002/0044067 A1 | 4/2002 | Ilcisin | |
| 2002/0077078 A1 | 6/2002 | Antti | |
| 2002/0081972 A1 | 6/2002 | Rankin | |
| 2002/0099822 A1 | 7/2002 | Rubin et al. | |
| 2002/0111954 A1 | 8/2002 | McCoy | |
| 2002/0143869 A1 | 10/2002 | Cohen | |
| 2002/0154055 A1 | 10/2002 | Davis et al. | |
| 2002/0163572 A1 | 11/2002 | Center, Jr. et al. | |
| 2002/0169664 A1 | 11/2002 | Walker et al. | |
| 2002/0169840 A1 | 11/2002 | Sheldon et al. | |
| 2002/0174073 A1 | 11/2002 | Nordman et al. | |
| 2002/0174363 A1 * | 11/2002 | Chefalas et al. | 713/201 |
| 2002/0177449 A1 | 11/2002 | McDonnell et al. | |
| 2002/0188562 A1 | 12/2002 | Igarashi et al. | |
| 2002/0198777 A1 | 12/2002 | Yuasa | |
| 2003/0008672 A1 | 1/2003 | Fujii | |
| 2003/0009593 A1 | 1/2003 | Apte | |
| 2003/0014286 A1 | 1/2003 | Cappellini | |
| 2003/0014637 A1 | 1/2003 | Ellison et al. | |
| 2003/0021413 A1 | 1/2003 | Kiiveri et al. | |
| 2003/0044050 A1 | 3/2003 | Clark et al. | |
| 2003/0086543 A1 | 5/2003 | Raymond | |
| 2003/0134645 A1 | 7/2003 | Stern et al. | |
| 2003/0145039 A1 | 7/2003 | Bonney et al. | |
| 2003/0149881 A1 | 8/2003 | Patel et al. | |
| 2003/0154254 A1 | 8/2003 | Awasthi | |
| 2003/0158960 A1 | 8/2003 | Engberg | |
| 2003/0177357 A1 | 9/2003 | Chamberlin et al. | |
| 2003/0217151 A1 | 11/2003 | Roese et al. | |
| 2003/0217287 A1 | 11/2003 | Kruglenko | |
| 2003/0220978 A1 | 11/2003 | Rhodes | |
| 2003/0224754 A1 | 12/2003 | Herzog | |
| 2003/0227386 A1 | 12/2003 | Pulkkinen et al. | |
| 2003/0233329 A1 | 12/2003 | Laraki et al. | |
| 2004/0015553 A1 | 1/2004 | Griffin et al. | |
| 2004/0030932 A1 | 2/2004 | Juels et al. | |
| 2004/0064692 A1 | 4/2004 | Kahn et al. | |
| 2004/0064734 A1 | 4/2004 | Ehrlich | |
| 2004/0083166 A1 | 4/2004 | Pailles | |
| 2004/0111625 A1 | 6/2004 | Duffy et al. | |
| 2004/0139204 A1 | 7/2004 | Ergezinger et al. | |
| 2004/0162904 A1 | 8/2004 | Eida et al. | |
| 2004/0165702 A1 | 8/2004 | Finnigan | |
| 2004/0178880 A1 | 9/2004 | Meyer et al. | |
| 2004/0181683 A1 | 9/2004 | Jia et al. | |
| 2004/0203776 A1 | 10/2004 | Jun | |
| 2004/0248588 A1 | 12/2004 | Pell et al. | |
| 2004/0254998 A1 | 12/2004 | Horvitz | |
| 2004/0255127 A1 | 12/2004 | Arnouse | |
| 2005/0004871 A1 | 1/2005 | Dort | |
| 2005/0008135 A1 | 1/2005 | Bressler | |
| 2005/0027618 A1 * | 2/2005 | Zucker et al. | 705/26 |
| 2005/0031106 A1 | 2/2005 | Henderson | |
| 2005/0044423 A1 | 2/2005 | Mellmer et al. | |
| 2005/0048951 A1 | 3/2005 | Saito | |
| 2005/0075096 A1 | 4/2005 | Aljuraid | |
| 2005/0084100 A1 | 4/2005 | Spies et al. | |
| 2005/0091393 A1 | 4/2005 | Gleeson et al. | |
| 2005/0091543 A1 | 4/2005 | Holtzman et al. | |
| 2005/0100140 A1 | 5/2005 | Tsai | |
| 2005/0114343 A1 | 5/2005 | Wesinger, Jr. et al. | |
| 2005/0136903 A1 | 6/2005 | Kashima et al. | |
| 2005/0172120 A1 * | 8/2005 | Wang et al. | 713/160 |
| 2005/0192056 A1 | 9/2005 | Karaki | |
| 2005/0198131 A1 | 9/2005 | Appelman et al. | |
| 2005/0204008 A1 | 9/2005 | Shinbrood | |
| 2005/0204037 A1 | 9/2005 | Levy | |
| 2005/0227705 A1 | 10/2005 | Rousu et al. | |
| 2005/0232423 A1 | 10/2005 | Horvitz et al. | |
| 2005/0246419 A1 * | 11/2005 | Jaatinen | 709/204 |
| 2005/0275543 A1 | 12/2005 | Hisano | |
| 2006/0005023 A1 | 1/2006 | Homer et al. | |
| 2006/0026438 A1 * | 2/2006 | Stern et al. | 713/184 |
| 2006/0031369 A1 | 2/2006 | Caron et al. | |
| 2006/0041507 A1 | 2/2006 | Novack et al. | |
| 2006/0052095 A1 | 3/2006 | Vazvan | |
| 2006/0079238 A1 | 4/2006 | Liu et al. | |
| 2006/0099967 A1 | 5/2006 | Colvin et al. | |
| 2006/0109983 A1 | 5/2006 | Young et al. | |
| 2006/0116142 A1 | 6/2006 | Cofta | |
| 2006/0123245 A1 | 6/2006 | Avidan et al. | |
| 2006/0152374 A1 | 7/2006 | Singer et al. | |
| 2006/0167991 A1 | 7/2006 | Heikes et al. | |
| 2006/0168059 A1 | 7/2006 | Chang et al. | |
| 2006/0173957 A1 | 8/2006 | Robinson et al. | |
| 2006/0176821 A1 | 8/2006 | Hemesath et al. | |
| 2006/0227955 A1 | 10/2006 | Thai et al. | |
| 2006/0248011 A1 | 11/2006 | Hecht-Nielsen et al. | |
| 2006/0256959 A1 | 11/2006 | Hymes | |
| 2006/0274896 A1 | 12/2006 | Livesay | |
| 2006/0276226 A1 | 12/2006 | Jiang | |
| 2007/0022165 A1 | 1/2007 | Daniels et al. | |
| 2007/0030824 A1 | 2/2007 | Ribaudo et al. | |

(56) References Cited

U.S. PATENT DOCUMENTS

| | | |
|---|---|---|
| 2007/0032225 A1 | 2/2007 | Konicek et al. |
| 2007/0036314 A1 | 2/2007 | Kloberdans et al. |
| 2007/0074046 A1 | 3/2007 | Czajkowski et al. |
| 2007/0127658 A1 | 6/2007 | Gruchala et al. |
| 2007/0130323 A1 | 6/2007 | Landsman et al. |
| 2007/0140145 A1 | 6/2007 | Kumar et al. |
| 2007/0180122 A1 | 8/2007 | Barrett |
| 2007/0203644 A1 | 8/2007 | Thota et al. |
| 2007/0204026 A1 | 8/2007 | Berger |
| 2007/0208816 A1 | 9/2007 | Baldwin et al. |
| 2007/0208947 A1 | 9/2007 | Sudo et al. |
| 2007/0242827 A1 | 10/2007 | Prafullchandra et al. |
| 2007/0243880 A1 | 10/2007 | Gits et al. |
| 2007/0250571 A1 | 10/2007 | Griffin, Jr. |
| 2007/0250641 A1 | 10/2007 | Flannery et al. |
| 2007/0255704 A1 | 11/2007 | Baek et al. |
| 2007/0264974 A1 | 11/2007 | Frank et al. |
| 2007/0277235 A1 | 11/2007 | Barrett et al. |
| 2007/0293202 A1 | 12/2007 | Moshir et al. |
| 2007/0294096 A1 | 12/2007 | Randall et al. |
| 2008/0005325 A1 | 1/2008 | Wynn et al. |
| 2008/0010665 A1 | 1/2008 | Hinton et al. |
| 2008/0056468 A1 | 3/2008 | Fredlund et al. |
| 2008/0071544 A1 | 3/2008 | Beaufays et al. |
| 2008/0086646 A1 | 4/2008 | Pizano |
| 2008/0108324 A1 | 5/2008 | Moshir et al. |
| 2008/0118150 A1 | 5/2008 | Balakrishnan et al. |
| 2008/0130630 A1 | 6/2008 | Shim et al. |
| 2008/0146157 A1 | 6/2008 | Aaron |
| 2008/0154697 A1 | 6/2008 | Guday et al. |
| 2008/0163365 A1 | 7/2008 | Austin et al. |
| 2008/0169903 A1 | 7/2008 | Fein et al. |
| 2008/0196098 A1 | 8/2008 | Cottrell et al. |
| 2008/0207329 A1 | 8/2008 | Wallace et al. |
| 2008/0235336 A1 | 9/2008 | Stern et al. |
| 2008/0247543 A1 | 10/2008 | Mick et al. |
| 2008/0248815 A1 | 10/2008 | Busch |
| 2008/0250129 A1 | 10/2008 | Carpenter et al. |
| 2008/0254817 A1 | 10/2008 | Tornkvist |
| 2008/0267099 A1 | 10/2008 | Curcio et al. |
| 2008/0294726 A1 | 11/2008 | Sidman |
| 2008/0300859 A1 | 12/2008 | Chen et al. |
| 2008/0318598 A1 | 12/2008 | Fry |
| 2009/0005072 A1 | 1/2009 | Forstall et al. |
| 2009/0081989 A1 | 3/2009 | Wuhrer |
| 2009/0099701 A1 | 4/2009 | Li et al. |
| 2009/0109037 A1 | 4/2009 | Farmer |
| 2009/0131022 A1 | 5/2009 | Buckley et al. |
| 2009/0132419 A1 | 5/2009 | Grammer et al. |
| 2009/0158054 A1 | 6/2009 | Dijk et al. |
| 2009/0170532 A1 | 7/2009 | Lee et al. |
| 2009/0183215 A1 | 7/2009 | McCartie et al. |
| 2009/0195445 A1 | 8/2009 | DeHaas |
| 2009/0204580 A1 | 8/2009 | Seamon et al. |
| 2009/0215469 A1 | 8/2009 | Fisher et al. |
| 2009/0227268 A1 | 9/2009 | Sorensson et al. |
| 2009/0234764 A1 | 9/2009 | Friesen |
| 2009/0248844 A1 | 10/2009 | Sommer et al. |
| 2009/0275363 A1 | 11/2009 | McGregor et al. |
| 2009/0298474 A1 | 12/2009 | George |
| 2009/0318112 A1 | 12/2009 | Vasten |
| 2009/0319172 A1 | 12/2009 | Almeida et al. |
| 2010/0009657 A1 | 1/2010 | Dingler et al. |
| 2010/0015991 A1 | 1/2010 | Evans et al. |
| 2010/0024042 A1 | 1/2010 | Motahari et al. |
| 2010/0053169 A1 | 3/2010 | Cook |
| 2010/0071035 A1 | 3/2010 | Budko et al. |
| 2010/0183125 A1 | 7/2010 | Hayes, Jr. et al. |
| 2010/0257222 A1 | 10/2010 | Hamilton, II et al. |
| 2010/0281051 A1 | 11/2010 | Sheffi et al. |
| 2010/0283728 A1 | 11/2010 | Hollemans et al. |
| 2010/0313253 A1 | 12/2010 | Reiss |
| 2011/0143716 A1 | 6/2011 | Shaw |
| 2011/0238767 A1 | 9/2011 | Murphy |
| 2012/0174233 A1 | 7/2012 | Waterson |

OTHER PUBLICATIONS

U.S. Appl. No. 12/927,791, Cohen et al.
U.S. Appl. No. 12/927,555, Cohen et al.
U.S. Appl. No. 12/927,500, Cohen et al.
U.S. Appl. No. 12/925,014, Cohen et al.
U.S. Appl. No. 12/924,992, Cohen et al.
U.S. Appl. No. 12/807,701, Cohen et al.
U.S. Appl. No. 12/807,700, Cohen et al.
U.S. Appl. No. 12/806,738, Cohen et al.
U.S. Appl. No. 12/806,677, Cohen et al.
U.S. Appl. No. 12/804,832, Cohen et al.
U.S. Appl. No. 12/804,765, Cohen et al.
U.S. Appl. No. 12/802,922, Cohen et al.
U.S. Appl. No. 12/802,863, Cohen et al.
U.S. Appl. No. 12/802,136, Cohen et al.
U.S. Appl. No. 12/799,794, Cohen et al.
U.S. Appl. No. 12/454,113, Cohen et al.
U.S. Appl. No. 12/287,268, Cohen et al.
U.S. Appl. No. 12/228,873, Cohen et al.
U.S. Appl. No. 12/228,664, Cohen et al.
"Sometimes, I just don't want them to know it's me calling . . . "; spoofcard.com; pp. 1-2; located at: http://www.spoofcard.com/; printed on Jul. 8, 2010.
"Spoof Caller ID with Telespoof.com"; Telespoof.com; Bearing a date of 2010; pp. 1-2; located at: http://www.telespoof.com/; printed on Jul. 8, 2010.
"Spoofkit is the ultimate windup kit available on the net today"; Spoofkit.com; Bearing dates of 2010-2014; pp. 1-6; located at: http://www.spoofkit.com/; printed on Jul. 8, 2010.

* cited by examiner

OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/228,664, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/228,873, entitled SYSTEM AND METHOD FOR TRANSMITTING ILLUSORY AND NON-ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 15, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,268, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 7, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/454,113, entitled SYSTEM AND METHOD FOR MODIFYING ILLUSORY USER IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 12, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/799,794, entitled SYSTEM AND METHOD FOR CONDITIONALLY TRANSMITTING ONE OR MORE LOCUM TENENTES, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Apr. 29, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to receiving a first communiqué that is affiliated with a source entity and that is directed to a receiving entity; and transmitting to the receiving entity, in lieu of the first communiqué, a second communiqué that is provided in accordance with one or more conditional directives to conditionally obfuscate identity of the source entity, the one or more conditional directives provided by the receiving entity. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for receiving a first communiqué that is affiliated with a source entity and that is directed to a receiving entity; and means for transmitting to the receiving entity, in lieu of the first communiqué, a second communiqué that is provided in accordance with one or more conditional directives to conditionally obfuscate identity of the source entity, the one or more conditional directives provided by the receiving entity. In addition to the foregoing, other system aspects are described in the claims, drawings, and text forming a part of the present disclosure.

A computationally implemented system includes, but is not limited to: circuitry for receiving a first communiqué that is affiliated with a source entity and that is directed to a receiving entity; and circuitry for transmitting to the receiving entity, in lieu of the first communiqué, a second communiqué that is provided in accordance with one or more conditional directives to conditionally obfuscate identity of the source entity, the one or more conditional directives provided by the receiving entity. In addition to the foregoing, other system aspects are described in the claims, drawings, and text forming a part of the present disclosure.

A computer program product including a signal-bearing medium bearing one or more instructions for receiving a first communiqué that is affiliated with a source entity and that is directed to a receiving entity; and one or more instructions for transmitting to the receiving entity, in lieu of the first communiqué, a second communiqué that is provided in accordance with one or more conditional directives to conditionally obfuscate identity of the source entity, the one or more conditional directives provided by the receiving entity. In addition to the foregoing, other computer program product aspects are described in the claims, drawings, and text forming a part of the present disclosure.

A method for transmitting to a receiving entity, in lieu of a first communiqué directed to the receiving entity, a second communiqué that is provided in accordance with one or more conditional directives to conditionally obfuscate identity of a source entity affiliated with the first communiqué, the one or more conditional directives being provided by the receiving entity, the method includes receiving a first communiqué that is affiliated with a source entity and that is directed to a receiving entity; and transmitting to the receiving entity, using a processor and in lieu of the first communiqué, a second communiqué that is provided in accordance with one or more conditional directives to conditionally obfuscate identity of the source entity, the one or more conditional directives provided by the receiving entity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
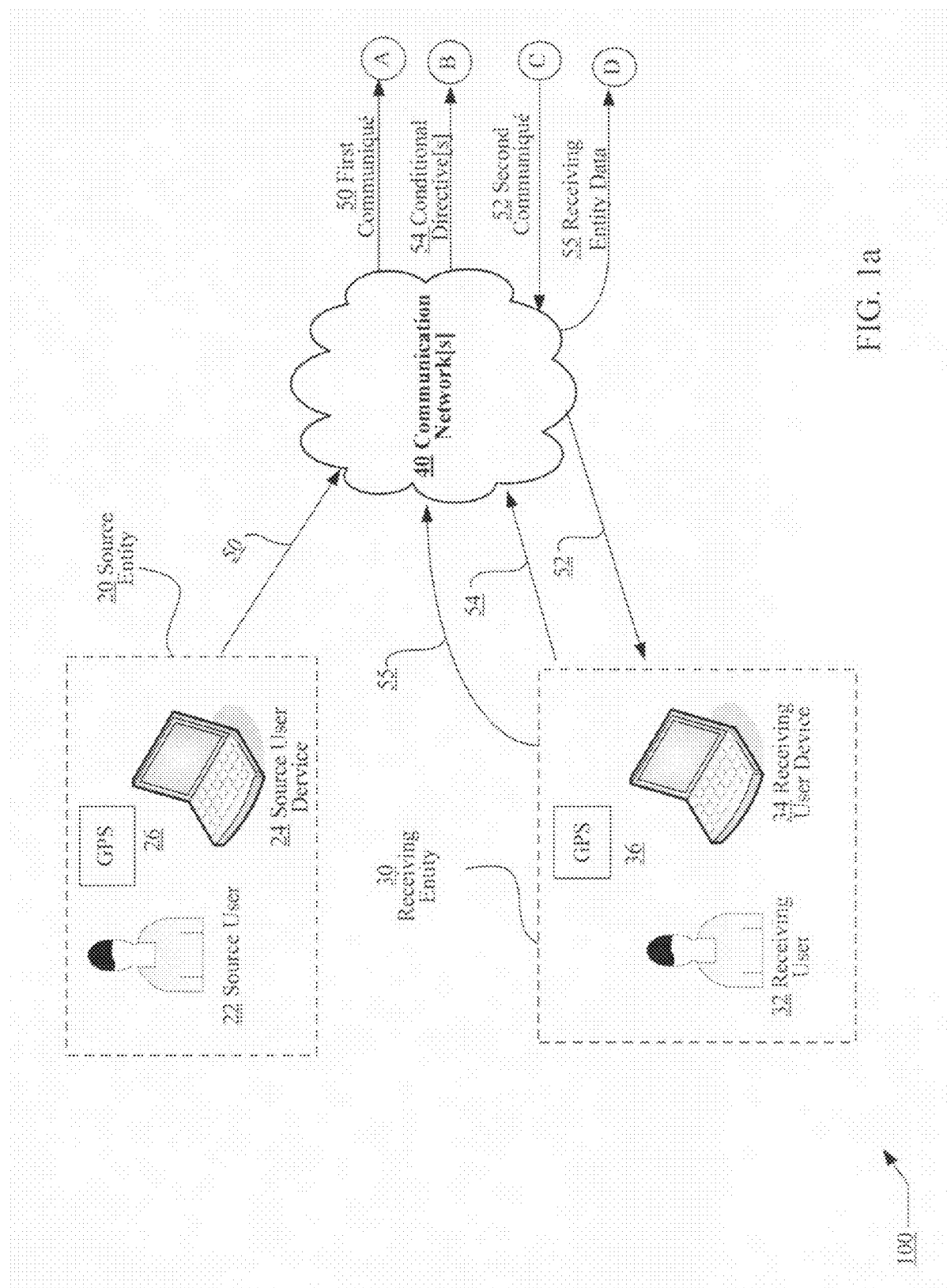
FIGS. 1a and 1b show a high-level block diagram of a network device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In recent years, the computing/communication industry has enjoyed dramatic technological advancement and spectacular commercial popularity, providing numerous benefits for those who choose to enjoy the fruits of technological developments in the computing/communication sectors. For example, with the dramatic development of personal communication devices such as cellular telephones, personal digital assistants (PDAs), Smartphones, laptop computers, desktop computers, and so forth, users of such devices are now able to maintain 24/7 connectivity with other users at relatively low costs. Such connectivity may be via, for example, a variety of communication channels including, for example, telephone calls, emails, Voice over Internet Protocol (VoIP) calls, text messaging (e.g., short message service or SMS, or multimedia messaging service or MMS), instant messaging (IM), and so forth. Unfortunately, in addition to providing significant benefits to users, users of such technologies must also deal with a whole new set of issues and problems that have arisen with this new computing/communication technology.

For example, users of such personal communication devices (e.g., cellular telephones, Smartphones, laptop and desktop computers, and so forth) are facing a number of privacy and security issues. One such issue that has arisen with respect to users of personal communication devices is that these personal communication devices are often easily accessible for use by those other than the primary users (e.g., owners) of such devices. As a result, communiqués (e.g., electronic communications including, for example, telephone calls, VoIP, emails, text messages, IMs, and so forth) including sensitive communiqués (e.g., highly personal or confidential business communiqués) that are directed to the primary users of such devices may be accessed by others potentially causing embarrassing if not devastating consequences to occur.

For example, it was extensively reported recently that a well-known and well-admired professional athlete was caught by his spouse having an extramarital affair. It was widely reported that the spouse discovered this affair when she discovered a voice message from her husband's mistress on her husband's cellular telephone. Because the husband (i.e., famous professional athlete) in that incident had not erased or was not able to hide or disguise the voice message from his mistress, the husband had to endure significant public humiliation and substantial financial loss due to loss of commercial endorsement income.

Of course the need for maintaining communication or communiqué secrecy is not just limited to personal situations, but may also be necessary in professional/business context. For example, it may be inappropriate for a person to receive particular communiqués while at work or while at other locations from certain parties (e.g., communiqués from girlfriends or communiqués from a particular websites or business).

According to various embodiments, methods, systems, and computer program products are provided for obfuscating identity of a source entity affiliated with a communiqué that is directed to a receiving entity, the obfuscating being based on one or more conditional directives provided by the receiving entity. More particularly, the methods, systems, and computer program products may be designed to receive a first communiqué that is affiliated with a source entity (e.g., an entity that is the original or intermediate source for the first communiqué) and that is directed to a receiving entity; and to transmit to the receiving entity, in lieu of the first communiqué, a second communiqué that is provided in accordance with one or more conditional directives to conditionally obfuscate identity of the source entity, the one or more conditional directives provided by the receiving entity.

For purposes of the following description, a "communiqué" may be in reference to any one of a variety of means for communicating including, for example, a telephone call, an email message, a text message (e.g., SMS or MMS), an instant message (IM), a Voice over Internet Protocol (VoIP) call, a voice message, a video message, and so forth. As will be further described herein, a source entity may be in reference to any entity that may be the original or an intermediate source for a communiqué. Examples of a source entity include, for example, a source user who may be a human or robotic user and/or a source user device such as a cellular telephone, Smartphone, laptop or desktop computer, and so forth. In some cases, a source entity may be an organization such as a business or a trade or interest group. In some instances, a source entity may be a website.

A receiving entity may be in reference to an entity that a communiqué is directed to (e.g., being sent to). Examples of a receiving entity include, for example, a receiving user who may be a human or robotic user and/or a receiving user device such a cellular telephone, a Smartphone, a laptop computer, a desktop computer, and so forth. In some cases, a receiving entity may be a voicemail service, a text messaging service, or a web-based application service.

A "conditional directive," as will be discussed herein, relates to an instruction or command to execute one or more actions when one or more conditions arise. For example, a conditional directive may be an instruction to intercept a first communiqué directed to a receiving entity and to transmit a second communiqué, in lieu of the first communiqué, to the receiving entity when a particular environmental condition arises with respect to the receiving entity (e.g., presence of a third party in the vicinity of the receiving entity).

Figure 1B:
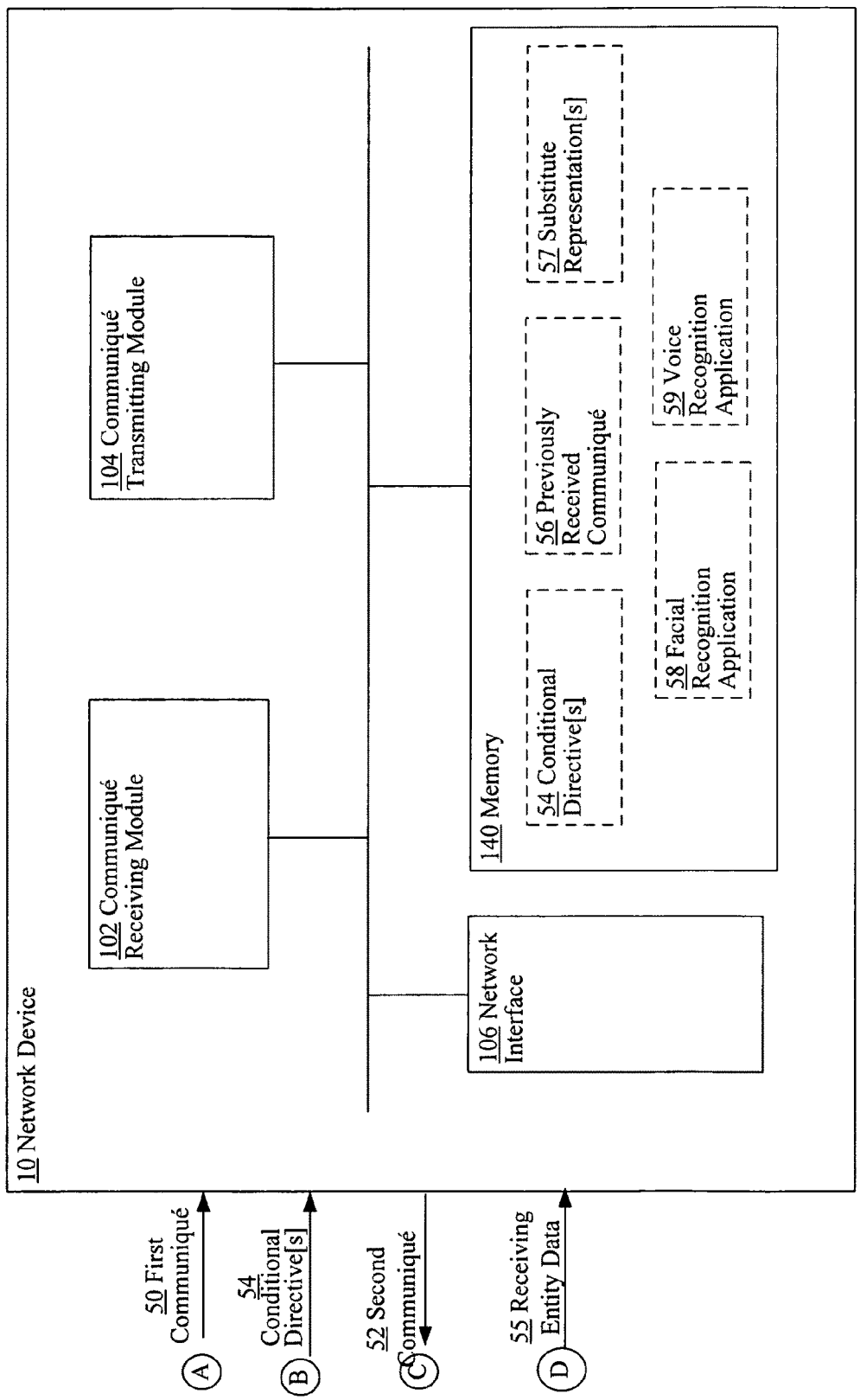

Turning now to FIGS. 1a, and 1b illustrating an example environment 100 in which the methods, systems, circuitry, and computer program products in accordance with various embodiments may be implemented by a network device 10. Among other things, the methods, systems, circuitry, and computer program products implemented by the network device 10 may be designed for receiving a first communiqué that is affiliated with a source entity and that is directed to a receiving entity; and for transmitting to the receiving entity, in lieu of the first communiqué, a second communiqué that is provided in accordance with one or more conditional directives to conditionally obfuscate identity of the source entity, the one or more conditional directives provided by the receiving entity. In some embodiments, the network device 10 may be located at one or more network nodes. For these embodiments, the network device 10 may include one or more network servers, one or more telephone switches, one or more telephone exchanges, and/or one or more routers. In some embodiments, the network device 10 may comprise of multiple network components such as in the case of cloud computing.

In some embodiments, the network device 10 may be designed to facilitate communication between different entities. For example, in some implementations, in which the network device 10 is a server, a router, a telephone switch, a telephone exchange, or some other network complement, the network device 10 may be designed to relay communiqués between a source entity 20 and a receiving entity 30. As briefly described above, a source entity 20 may comprise of a human or robotic source user 22 and/or a source user device 24 (e.g., a laptop computer, a desktop computer, a workstation, a Smartphone, a cellular telephone, a personal digital assistant (PDA), or other computing/communication devices). From another perspective, the source entity 20 may be a website or an organization such as a business, a social group, a trade/technical group, or an interest group. In some cases, the source entity 20 may include a global positioning system (GPS) 26, which may be part of the source user device 24.

Similarly, a receiving entity 30 may comprise a receiving user 32 who may be a human or robotic user and/or a receiving user device 34 (e.g., a laptop computer, a workstation, a Smartphone, a PDA, a desktop computer, a cellular telephone, and so forth). In some cases, the receiving entity 30 may be a voicemail service, a text messaging service, a web-based application service, and so forth that may be associated with, for example, a receiving user 32.

As briefly described above, the network device 10 may be designed to receive a first communiqué 50 that is affiliated with a source entity 20 and that is directed to a receiving entity 30. In some cases, the first communiqué 50 may be received from the source entity 20 via one or more communication networks 40. The one or more communication networks 40 may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In some embodiments, the reception of the first communiqué 50 may involve the interception (e.g., seizing capturing, or interrupting) of the first communiqué 50. As will be further described herein, if the first communiqué 50 is indeed intercepted, then the intercepting of the first communiqué 50 may be in accordance with one or more conditional directives 54 as provided by the receiving entity 30.

The first communiqué 50 to be received or intercepted by the network device 10 may be directed to (e.g., destined for or sent to) the receiving entity 30 and may be any one of a variety of electronic communications including, for example, a telephone call, a VoIP call, a voice mail or message, an email, a text message (e.g., SMS or MMS), an IM, a video message, and so forth. Depending on whether the first communiqué 50 is an email, a telephone call, a VoIP call, a video call or some other type of communiqué, the first communiqué 50 may include various types of data including, for example, header data (which may identify the sender, the destination address and/or receiving party, subject heading, routing or path, and so forth), message content data (e.g., audio data if the first communiqué 50 is a telephone or VoIP call or text data if the first communiqué 50 is an email or text message), and/or metadata.

In various embodiments, the first communiqué 50 may identify the source entity 20 by indicating the source entity 20 in the form of one or more representations of the source entity 20. A representation of the source entity 20, which may be included in the first communiqué 50 in the form of header data, message content data, or metadata, may be any one of a name (e.g., actual legal name or username), address (e.g., email address, uniform resource locator or URL, Internet Protocol or IP address, and so forth), telephone number, image (e.g., digital facial image or iconic figure), voice signature, or any other identifier that may be associated with the source entity 20.

The received or intercepted first communiqué 50 may also identify the receiving entity 30 by indicating the receiving entity 30 in the form of one or more representations of the receiving entity 30. For example, in order to ensure the first communiqué 50 reaches the correct destination, the first communiqué 50 may include at least a representation of the receiving entity 30 in the form of a name, an address (e.g., email address, uniform resource locator or URL, Internet Protocol or IP address, and so forth), or a telephone number (e.g., in the case where the first communiqué 50 is a telephone call) associated with the receiving entity 30.

After receiving or intercepting the first communiqué 50, the network device 10, as briefly described above, may be designed to transmit to the receiving entity 30, in lieu of the first communiqué 50, a second communiqué 52 that is provided in accordance with one or more conditional directives 54 to conditionally obfuscate (e.g., hide or disguise) the identity of the source entity 20, the one or more conditional directives 54 being provided by the receiving entity 30. In other words, the network device 10 may provide to the receiving entity 30 a second communiqué 52 instead of the first communiqué 50 in order to hide or disguise the identity or affiliation of the source entity 20 with the first communiqué 50 in accordance with the conditional directives 54 of the receiving entity 30. In various alternative embodiments, the one or more conditional directives 54 that are provided by the receiving entity 30 may be acquired from the receiving entity 30 or may be retrieved from a memory 140.

In some cases, the second communiqué 52 may be provided by modifying the first communiqué 50 in accordance with the one or more conditional directives 54 in order to obfuscate the identity of the affiliated source entity 20. Alternatively, the second communiqué 52 may be a substitute communiqué that is a completely distinct and unrelated communiqué from the first communiqué 50. Regardless of whether the second communiqué 52 is merely a modified version of the first communiqué 50 or a completely distinct communiqué from the first communiqué 50, the second communiqué 52 may not be affiliated with the source entity 20. In particular, the second communiqué 52 in various embodiments may not include any representation of the source entity 20.

In embodiments where the second communiqué 52 is provided by modifying the first communiqué 50, the first communiqué 50 may be modified by replacing one or more representations of the source entity 20 that may be included in the first communiqué 50 with one or more locum tenentes (e.g., a Latin term for placeholders, substitutes, and so forth). For example, replacing one or more representative addresses or names of the source entity 20 included in the first communiqué 50 with one or more substitute addresses or names. Note that the one or more locum tenentes (e.g., substitute addresses or substitute names) that are to replace the representations (e.g., representative addresses and names) of the source entity 20 may be either fictional or non-fictional substitutes as will be further described herein. In cases where the first communiqué 50 is an audio communiqué such as a telephone call or a VoIP call, the voice signature of the source entity 20 (e.g., source user 22) may be modified as will be further described herein. A "voice signature" may be in reference to the distinct patterns of speech (e.g., tone, pitch, rhythm, accent, and so forth) that each person's voice may be associated with.

In embodiments in which the second communiqué 52 is provided by providing a substitute communiqué that is a distinct communiqué unrelated to the first communiqué 50, the second communiqué 52 may be a direct or indirect substitute for the first communiqué 50. That is, in some embodiments, the second communiqué 52 may be a direct substitute that is the same type of communiqué as the first communiqué 50. For example replacing an email with another email. In other embodiments, however, the second communiqué 52 may be an indirect substitute that is a different type of communiqué from the first communiqué 50. For example, replacing a text message with a voice message. In some cases, the second communiqué 52 may have been previously provided by the receiving entity 30. In some embodiments, the second communiqué 52 may be a copy of a communiqué (which may have been sent by a third party) that was previously received by the receiving entity 30. For these embodiments, the second communiqué 52 may be a copy of the most recently received communiqué received by the receiving entity 30.

In various embodiments, the transmission of the second communiqué 52, in lieu of the first communiqué 50, by the network device 10 may be in response to the network device 10 at least determining that the first communiqué 50 includes data that associates the first communiqué 50 with the source entity 20. For these embodiments, the data that associates the first communiqué 50 with the source entity 20 may be in the form of header data, message content data, and/or metadata. In some cases, in order to determine whether the first communiqué 50 includes data that associates the first communiqué 50 with the source entity 20, the network device 10 may be designed to look for one or more representations (e.g., names, addresses, telephone numbers, images, voice signatures, and/or other identifiers) of the source entity 20 in the first communiqué 50. Additionally, the network device 10 may be designed to determine that the first communiqué 50 is indeed directed to the receiving entity 30 prior to receiving (e.g., intercepting) the first communiqué 50 or transmitting the second communiqué 52 to the receiving entity 30 in lieu of the first communiqué 50.

As indicated above, the transmission of the second communiqué 52 to the receiving entity 30, as well as the interception of the first communiqué 50 in some cases, may be based on the one or more conditional directives 54 provided by the receiving entity 30. The one or more conditional directives 54 may instruct the network device 10 to transmit the second communiqué 52 to the receiving entity 30, in lieu of the first communiqué 50, only when one or more specific conditions arise. These conditions include, for example, the receiving entity 30 being at one or more specific locations, the receiving entity 30 being at specific times of the day or calendar, and/or the receiving entity 30 being present when one or more specific environmental conditions arise such as when a particular third party is in the vicinity of the receiving entity 30 as will be further described below.

Note that in order to facilitate the conditional responses (e.g., conditional interception of the first communiqué 50 and/or the transmission of the second communiqué 52 in lieu of the first communiqué 50) of the network device 10, in some embodiments, the network device 10 may be designed to receive and analyze receiving entity data 55 from the receiving entity 30 that indicate various characteristics (e.g., GPS detected location, local time, and so forth) associated with the receiving entity 30. Note further that in some cases, the receiving entity data 55 may also comprise microblogs or "twitter" data that may indicate environmental conditions as reported by the receiving entity 30 (e.g., receiving user 32).

In some embodiments, the network device 10 may be designed to receive the one or more conditional directives 54 from the receiving entity 30 prior to receiving the first communiqué 50 and/or transmitting the second communiqué 52 to the receiving entity 30 in lieu of the first communiqué 50. For these embodiments the one or more received conditional directives 54 may then be stored in a memory 140, to be subsequently retrieved from the memory 140 for execution at some later point in time.

Turning specifically now to the network device 10 of FIG. 1b. The network device 10, as depicted, may include a variety of modules, sub-modules, and various other components. The network device 10, in some embodiments, may be a single network device such as a single server, a single router, a single telephone switch, and so forth. Alternatively, the network device 10 may be a collection of network component devices including a collection of one or more servers, one or more network computers, one or more storage devices and/or one or more other network component devices such as the case in cloud computing. Thus, the network device 10 may be implemented at a single network site or at multiple network sites.

Figure 2A:
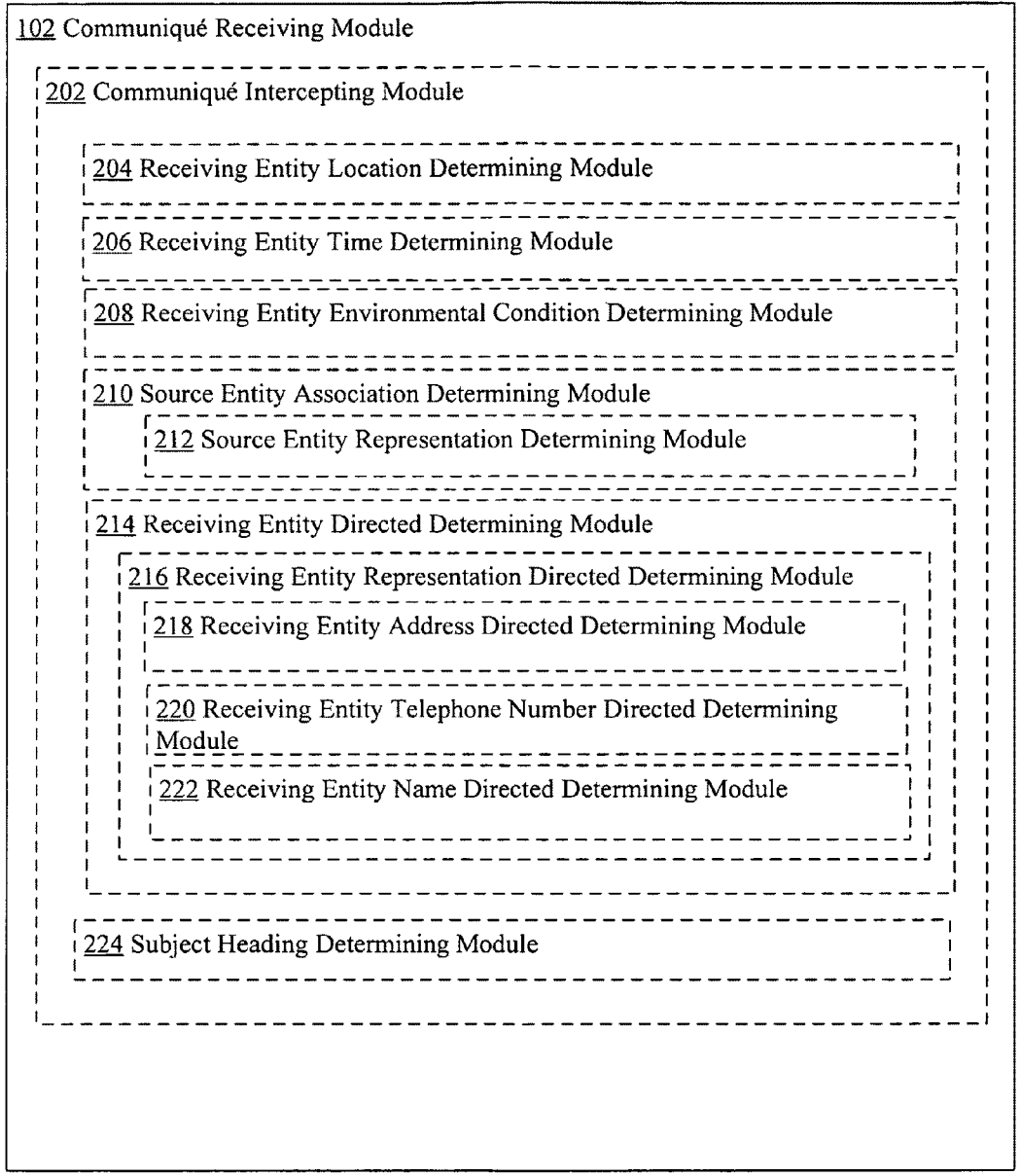
FIG. 2a shows another perspective of the communiqué receiving module 102 of the network device 10 of FIG. 1b.
Figure 2B:
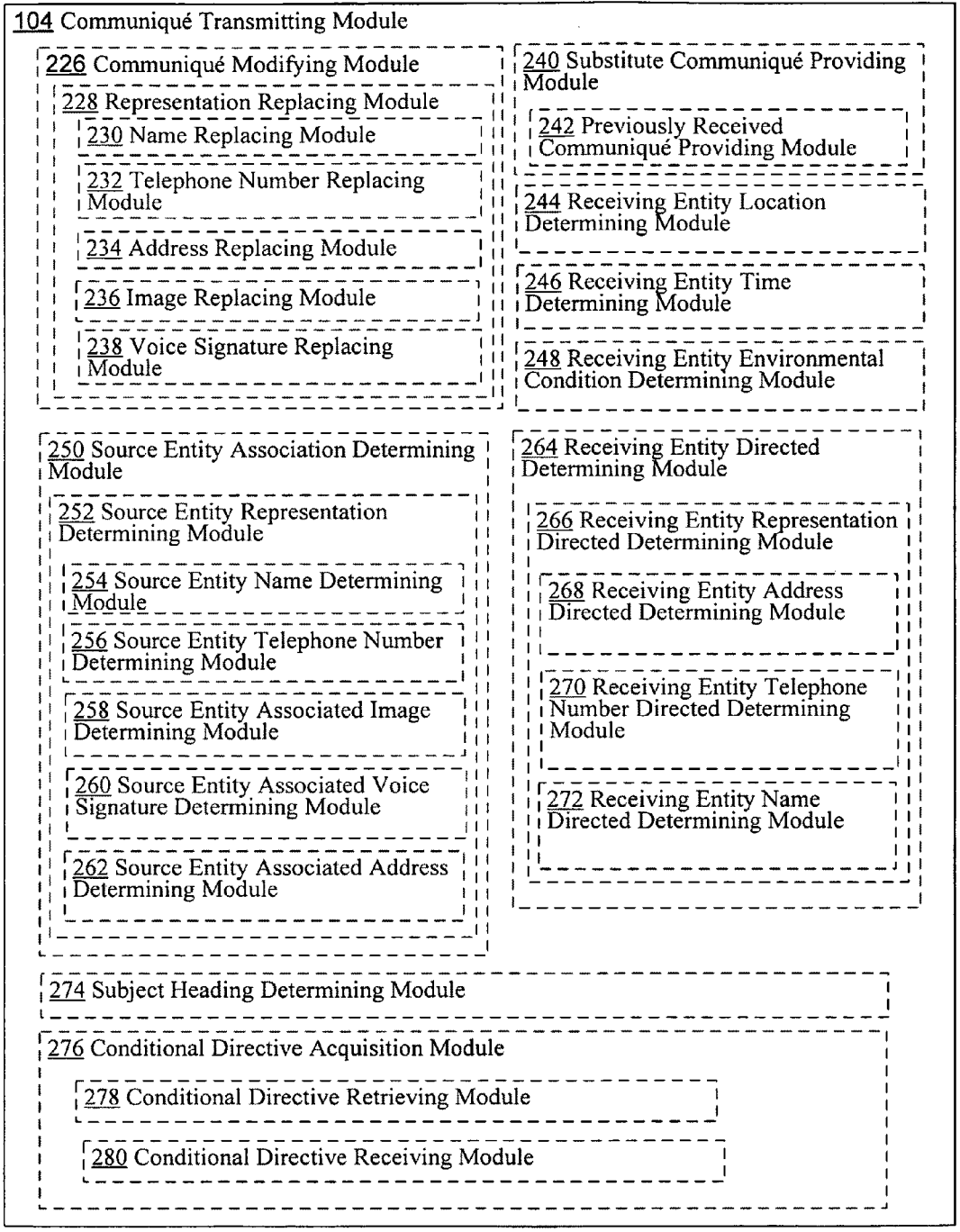
FIG. 2b shows another perspective of the communiqué transmitting module 104 of the network device 10 of FIG. 1b.

As shown, the network device 10 may include at least a communiqué receiving module 102 (which may further include one or more sub-modules as illustrated in FIG. 2a) and a communiqué transmitting module 104 (which may further include one or more sub-modules as illustrated in FIG. 2b). In various embodiments, the network device 10 may also include a network interface 106 (e.g., network interface card or NIC) and/or a memory 140. Although not depicted, the network device 10 may also include other components such as one or more processors (e.g., microprocessors) and one or more user interfaces. In various embodiments, the various modules included in the network device 10 including the communiqué receiving module 102, the communiqué transmitting module 104, and their sub-modules (as depicted in FIGS. 2a and 2b), may be implemented using hardware, software, firmware, or any combination thereof.

For example, in some embodiments, the communiqué receiving module 102 and the communiqué transmitting module 104 (and their sub-modules) may be implemented using hardware such as specially designed circuitry including, for example, application specific integrated circuit or ASIC. Alternatively, the communiqué receiving module 102 and the communiqué transmitting module 104 (and their sub-modules) may be implemented using software in the form of computer readable instructions that is executed by one or more processors as will be further described below with respect to FIG. 6. In still other embodiments, the communiqué receiving module 102 and the communiqué transmitting module 104 (and their sub-modules) may be implemented using a combination of hardware and software such as when the communiqué receiving module 102 and the communiqué transmitting module 104 (and their sub-modules) are implemented in the form of Field Programmable Gate Arrays or FPGAs.

Note that for ease of illustration and understanding, FIG. 1b illustrates a single device embodiment of the network device 10 (e.g., meaning that the network device 10 that is depicted in FIG. 1b is depicted as being embodied in a single network component device such as at a single server rather than at multiple servers as in the case of cloud computing). However, those having ordinary skill in the art will that the network device 10 may be implemented using multiple network component devices (e.g., multiple servers) located at multiple network sites such as in the case in cloud computing.

Further note that again for ease of illustration and understanding FIG. 1b merely illustrates a "hardware" embodiment of the network device 10 in which the communiqué receiving module 102 and the communiqué transmitting module 104 (and their sub-modules) are implemented using hardware (e.g., circuitry). Again note that although FIG. 1b illustrates only the hardware embodiment of the network device 10, those having ordinary skill in the art will recognize that the communiqué receiving module 102 and the communiqué transmitting module 104 (and their sub-modules) may also be implemented using software, firmware, or any combination of hardware, software, and firmware. Further, one or more of the modules of the network device 10 including the communiqué receiving module 102 and the communiqué transmitting module 104 (and their sub-modules) may be located at different network sites as is the case in cloud computing.

The communiqué receiving module 102 may be configured to, among other things, receive a first communiqué 50 that is affiliated with a source entity 20 and that is directed to a receiving entity 30. In contrast, the communiqué transmitting module 104 may be configured to, among other things, transmit to the receiving entity 30, in lieu of the first communiqué 50, a second communiqué 52 that is provided in accordance with one or more conditional directives 54 to conditionally obfuscate identity of the source entity 20, the one or more conditional directives 54 provided by the receiving entity 30.

In various embodiments, the network device 10 may include a memory 140 for storing various types of data. For these embodiments, memory 140 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 140 may be located at a single network site. Alternatively, memory 140 may be located at multiple network sites.

The memory 140 may store a variety of data in various alternative embodiments. For example, in some embodiments, memory 140 may store one or more conditional directives 54, one or more previously received communiqués 56, one or more substitute representations 57, a facial recognition application 58, and/or a voice recognition application 59. In embodiments where the memory 140 includes the one or more previously received communiqués 56, the one or more previously received communiqués 56 may be communiqués that were previously received by the network device 10 and that were directed to the receiving entity 30. In some cases, the one or more previously received communiqués 56 may have been sent by one or more third party entities that may not be related to the source entity 20.

In embodiments where the memory 140 includes the one or more substitute representations 57, the one or more substitute representations 57 (e.g., one or more substitute names, addresses, telephone numbers, images, voice signatures, and so forth) may be used as one or more locum tenentes to replace one or more representations of the source entity 20 that may be included in the first communiqué 50 received by the network device 10. In some embodiments, the memory 140 may include a facial recognition application 58, and/or a voice recognition application 59. These applications may be used in some cases in order to, for example, determine that the first communiqué 50 received by the network device 10 includes one or more representations (e.g., in the form of image representations and/or voice representations) of the source entity 20.

Referring now to FIG. 2a illustrating a particular implementation of communiqué receiving module 102 of FIG. 1b. As illustrated, the communiqué receiving module 102 may include one or more sub-modules in various alternative implementations. For example, in some implementations, the communiqué receiving module 102 may include a communiqué interception module 202 that may be configured to at least intercept the first communiqué 50 directed to the receiving entity 30 and in accordance with the one or more conditional directives 54 to conditionally obfuscate the identity of a source entity 20 affiliated with the first communiqué 50. In embodiments in which the communiqué receiving module 102 includes the communiqué intercepting module 202, the communiqué intercepting module 202 may further include a receiving entity location determining module 204, a receiving entity time determining module 206, a receiving entity environmental condition determining module 208, a source entity association determining module 210 (which may further include a source entity representation determining module 212), a receiving entity directed determining module 214, and/or a subject heading determining module 224.

In embodiments in which the communiqué intercepting module 202 includes the receiving entity directed determining module 214, the receiving entity directed determining module 214 may further include a receiving entity representation directed determining module 216 that may further include a receiving entity address directed determining module 218, a receiving entity telephone number directed determining module 220, and/or a receiving entity name directed determining module 222. As indicated earlier, each of the sub-modules of the communiqué receiving module 102 may be implemented using hardware, software (e.g., computer readable instructions executed by one or more processors), firmware, or any combination thereof. Specific details related to the communiqué receiving module 102 as well as the above-described sub-modules of the communiqué receiving module 102 will be provided below in reference to the operations and processes to be described herein.

Referring now to FIG. 2b illustrating a particular implementation of the communiqué transmitting module 104 of FIG. 1b. As illustrated, the communiqué transmitting module 104 may also include one or more sub-modules in various alternative implementations. For example, in some implementations, the communiqué transmitting module 104 may include a communiqué modifying module 226, a substitute communiqué providing module 240 (which may further include a previously received communiqué providing module 242), a receiving entity location determining module 244, a receiving entity time determining module 246, a receiving entity environmental condition determining module 248, a source entity association determining module 250, a receiving entity directed determining module 264, a subject heading determining module 274, and/or a conditional directive acquisition module 276 (which may further include a conditional directive retrieving module 278 and/or a conditional directive receiving module 280).

In embodiments in which the communiqué transmitting module 104 includes the communiqué modifying module 226, the communiqué modifying module 226 may also include a representation replacing module 228 that may further include a name replacing module 230, a telephone number replacing module 232, an address replacing module 234, an image replacing module 236, and/or a voice signature replacing module 238. In embodiments in which the communiqué transmitting module 104 includes the source entity association determining module 250, the source entity association determining module 250 may also include a source entity representation determining module 252 that may further include a source entity name determining module 254, a source entity telephone number determining module 256, a source entity associated image determining module 258, a source entity associated voice signature determining module 260, and/or a source entity associated address determining module 262.

In embodiments in which the communiqué transmitting module 104 includes the receiving entity directed determining module 264, the receiving entity directed determining module 264 may also include a receiving entity representation directed determining module 266 that may further include a receiving entity address directed determining module 268, a receiving entity telephone number directed determining module 270, and/or a receiving entity name directed determining module 272. As previously indicated, each of the sub-modules of the communiqué transmitting module 104 may be implemented using hardware, software (e.g., computer readable instructions executed by one or more processors), firmware, or any combination thereof. Specific details related to the above-described sub-modules of the communiqué transmitting module 104 will be provided below in reference to the operations and processes to be described herein.

Figure 3:
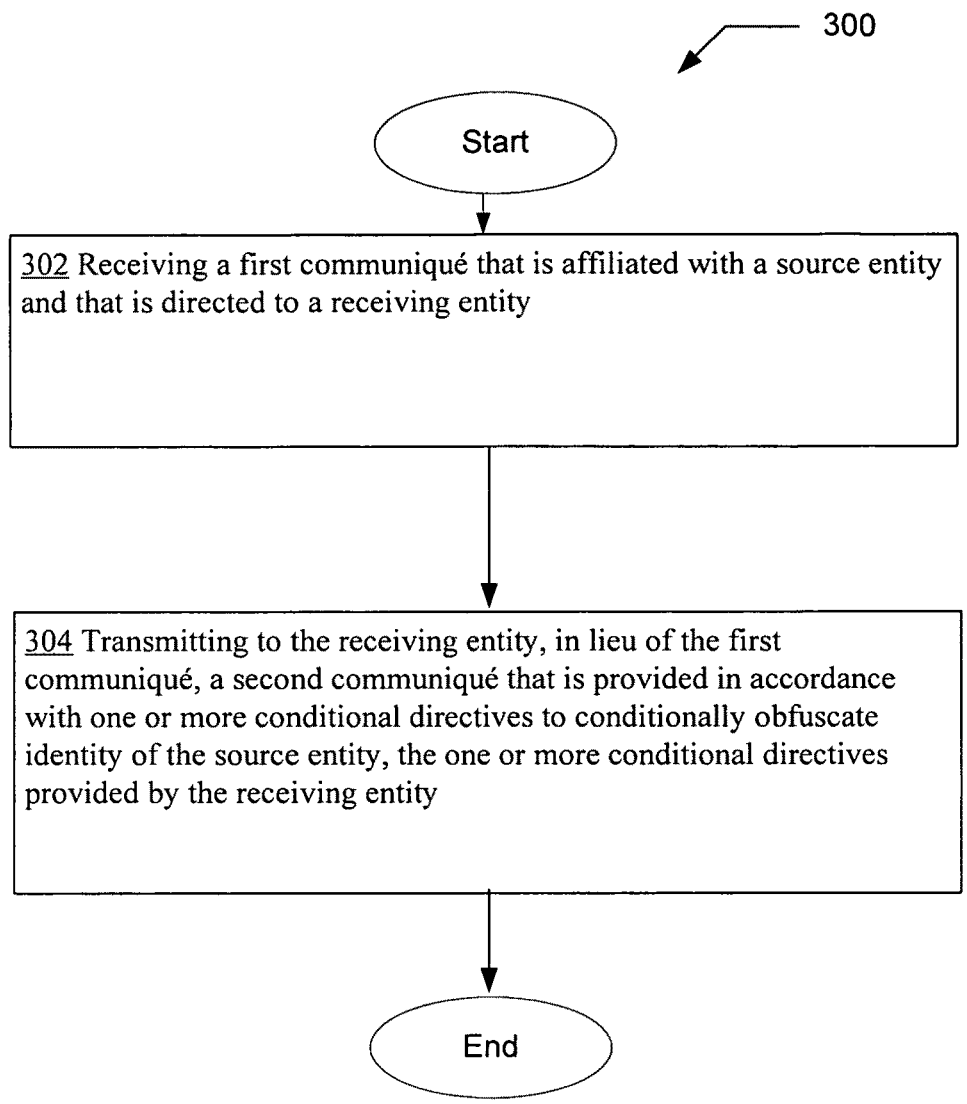
FIG. 3 is a high-level logic flowchart of a process.

A more detailed discussion related to the network device 10 of FIG. 1b will now be provided with respect to the processes and operations to be described herein. FIG. 3 illustrates an operational flow 300 representing example operations for, among other things, obfuscating identify of a source entity affiliated with a communiqué that is directed to a receiving entity, the obfuscation being in accordance with one or more conditional directives provided by the receiving entity. In FIG. 3 and in the following figures that include various examples of operational flows, discussions and explanations will be provided with respect to the exemplary environment 100 described above and as illustrated in FIGS. 1a and 1b, and/or with respect to other examples (e.g., as provided in FIGS. 2a, 2b, and 6) and contexts. However, it should be understood that the operational flows may be executed in a number of other environments and contexts, and/or in modified versions of FIGS. 1a, 1b, 2a, 2b, and 6. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 3 as well as the other operations to be described herein may be performed by at least one of a machine, an article of manufacture, or a composition of matter.

In any event, after a start operation, the operational flow 300 of FIG. 3 may move to a communiqué receiving operation 302 for receiving a first communiqué that is affiliated with a source entity and that is directed to a receiving entity. For instance, and as an illustration, the communiqué receiving module 102 of the network device 10 of the example environment 100 of FIGS. 1a and 1b receiving a first communiqué 50 (e.g., a telephone call, an email, a text message, an IM, and so forth) that is affiliated with a source entity 20 and that is directed to a receiving entity 30. In various implementations, the source entity 20 may be a human or robotic source user 22 and/or a source user device 24. In some cases, the source entity 20 may be a website or an organization such as a business, a social group, a trade/technical group, or an interest group. In some implementations, the receiving entity 30 may be a human or robotic receiving user 32 and/or a receiving user device 34. In some cases, the receiving entity 30 may be a voicemail service, a text messaging service, or a web-based application service.

In addition to the communiqué receiving operation 302, operational flow 300 may also include a communiqué transmitting operation 304 for transmitting to the receiving entity, in lieu of the first communiqué, a second communiqué that is provided in accordance with one or more conditional directives to conditionally obfuscate identity of the source entity, the one or more conditional directives provided by the receiving entity as further illustrated in FIG. 3. For instance, the communiqué transmitting module 104 of the network device 10 of FIG. 1b transmitting to the receiving entity 30, in lieu of the first communiqué 50, a second communiqué 52 that is provided in accordance with one or more conditional directives 54 to conditionally obfuscate (e.g., disguise or hide) identity of the source entity 20, the one or more conditional directives 54 provided by the receiving entity 30.

Figure 4A:
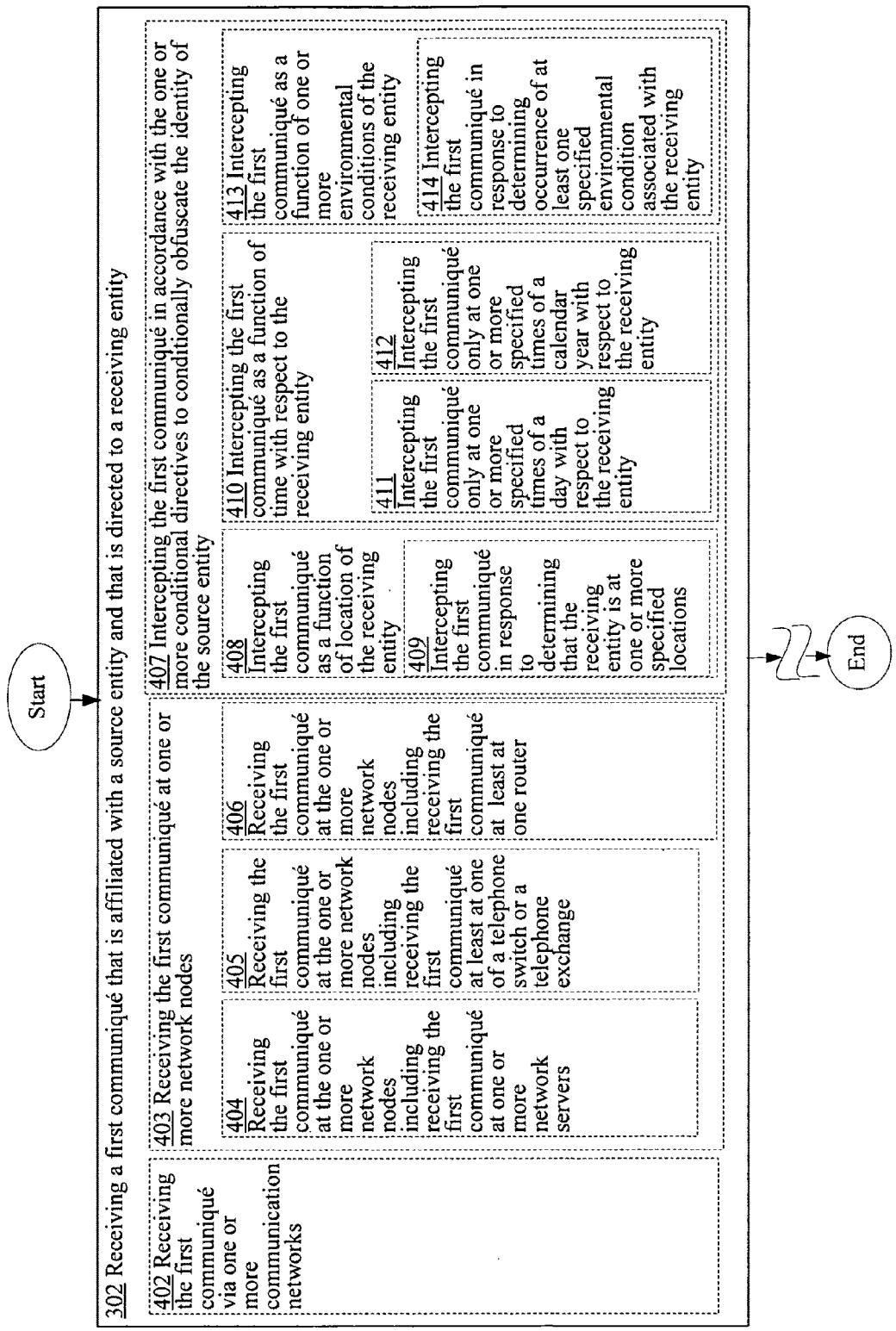
FIG. 4a is a high-level logic flowchart of a process depicting alternate implementations of the communiqué receiving operation 302 of FIG. 3.

As will be further described herein, the communiqué receiving operation 302 and the communiqué transmitting operation 304 of FIG. 3 may be executed in a variety of different ways in various alternative implementations. For example, FIGS. 4a, 4b, 4c, 4d, 4e, and 4f illustrate some of the various ways that the communiqué receiving operation 302 of FIG. 3 may be executed in various alternative implementations. In some implementations, for instance, the communiqué receiving operation 302 of FIG. 3 may include an operation 402 for receiving the first communiqué via one or more communication networks as depicted in FIG. 4a. For instance, the communiqué receiving module 102 of the network device 10 of FIG. 1b receiving the first communiqué 50 via one or more communication networks 40 (e.g., one or more of a WLAN, a WMAN, a WiMAX, a PTSN, a cellular network, a Client/Server Network, a VPN, and/or other types of networks).

In the same or different implementations, the communiqué receiving operation 302 of FIG. 3 may include an operation 403 for receiving the first communiqué at one or more network nodes as further depicted in FIG. 4a. For instance, the communiqué receiving module 102 of the network device 10 of FIG. 1b receiving the first communiqué 50 at one or more network nodes when the network device 10 is located at one or more network nodes including, for example, when the network device 10 is located at multiple network sites such as in the case in cloud computing.

In some implementations, operation 403 may further include an operation 404 for receiving the first communiqué at the one or more network nodes including receiving the first communiqué at one or more network servers as further depicted in FIG. 4a. For instance, the communiqué receiving module 102 of the network device 10 of FIG. 1b receiving the first communiqué 50 at the one or more network nodes including receiving the first communiqué 50 at one or more network servers.

In the same or different implementations, operation 403 may include an operation 405 for receiving the first communiqué at the one or more network nodes including receiving the first communiqué at least at one of a telephone switch or a telephone exchange as further depicted in FIG. 4a. For instance, the communiqué receiving module 102 of the network device 10 of FIG. 1b receiving the first communiqué 50 at the one or more network nodes including receiving the first communiqué 50 at least at one of a telephone switch or a telephone exchange.

In the same or different implementations, operation 403 may include an operation 406 for receiving the first communiqué at the one or more network nodes including receiving the first communiqué at least at one router as depicted in FIG. 4a. For instance, the communiqué receiving module 102 of the network device 10 of FIG. 1b receiving the first communiqué 50 at the one or more network nodes including receiving the first communiqué 50 at least at one router.

In some cases, the communiqué receiving operation 302 of FIG. 3 may include an operation 407 for intercepting the first communiqué in accordance with the one or more conditional directives to conditionally obfuscate the identity of the source entity as depicted in FIG. 4a. For instance, the communiqué intercepting module 202 of the network device 10 of FIG. 1b intercepting (e.g., seize, capture, interrupt, and so forth) the first communiqué 50 in accordance with the one or more conditional directives 54 to conditionally obfuscate (e.g., conceal, disguise, distort, etc.) the identity of the source entity 20.

Figure 4B:
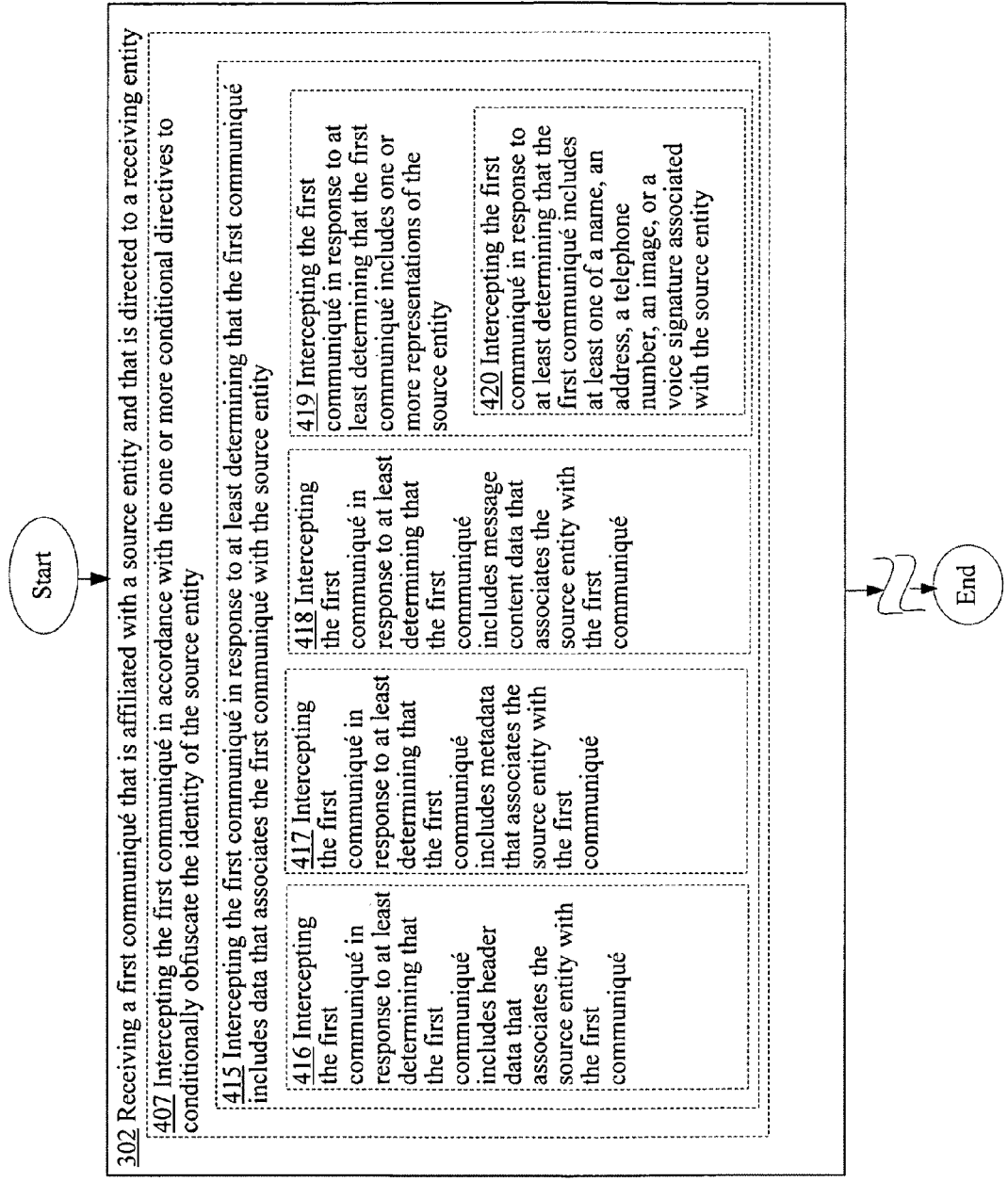
FIG. 4b is a high-level logic flowchart of a process depicting alternate implementations of the communiqué receiving operation 302 of FIG. 3.
Figure 4C:
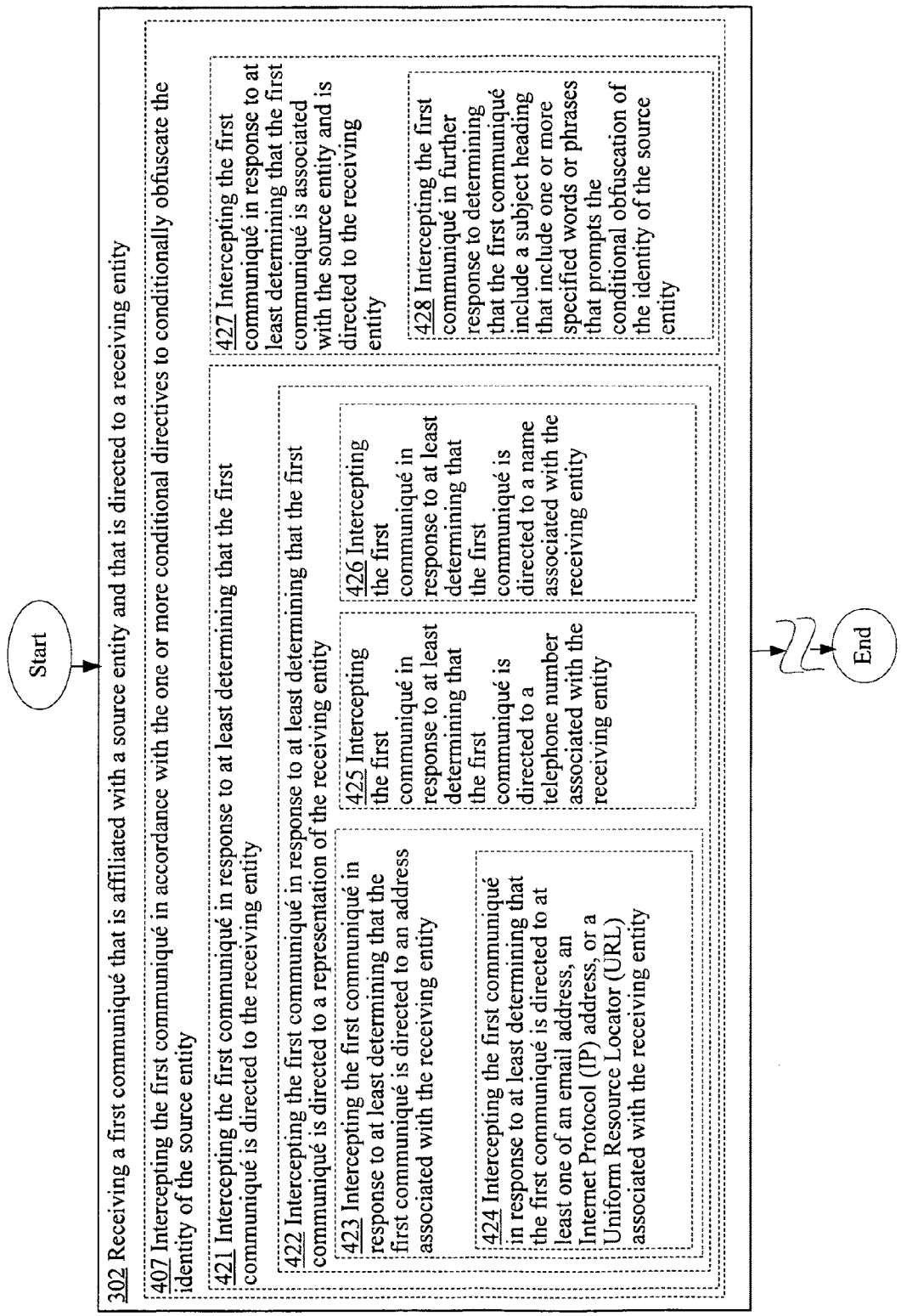
FIG. 4c is a high-level logic flowchart of a process depicting alternate implementations of the communiqué receiving operation 302 of FIG. 3.

The operation 407 for intercepting the first communiqué 50 may be executed in a number of alternative ways in various alternative implementations as illustrated in FIGS. 4a, 4b, and 4c. For example, in various cases, operation 407 may further include an operation 408 for intercepting the first communiqué as a function of location of the receiving entity as depicted in FIG. 4a. For instance, the communiqué intercepting module 202 of the network device 10 intercepting the first communiqué 50 as a function of location of the receiving entity 30 (e.g., a receiving user 32 who may be a human or robotic user and/or a receiving user device 34). In other words, the communiqué intercepting module 202 conditionally intercepting the first communiqué 50 only when the receiving entity 30 is at, for example, a particular location. The location of the receiving entity 30 may be detected and provided by, for example, a GPS 26.

Thus, in some cases, operation 408 may further include an operation 409 for intercepting the first communiqué in response to determining that the receiving entity is at one or more specified locations as depicted in FIG. 4a. For instance, the communiqué intercepting module 202 including the receiving entity location determining module 204 (see FIG. 2a) of the network device 10 intercepting the first communiqué 50 in response to the receiving entity location determining module 204 determining that the receiving entity 30 is at one or more specified locations (e.g., one or more identified locations such as home, office, school, and so forth).

In the same or different implementations, operation 407 for intercepting the first communiqué 50 may include an operation 410 for intercepting the first communiqué as a function of time with respect to the receiving entity as depicted in FIG. 4a. For instance, the communiqué intercepting module 202 of the network device 10 intercepting the first communiqué 50 as a function of time with respect to the receiving entity 30. In other words, to conditionally intercept the first communiqué 50 only when, for example, the receiving entity 30 reaches or is at certain point or points in time.

In some implementations, operation 410 may further include an operation 411 for intercepting the first communiqué only at one or more specified times of a day with respect to the receiving entity as further depicted in FIG. 4a. For instance, the communiqué intercepting module 202 including the receiving entity time determining module 206 (see FIG. 2a) of the network device 10 intercepting the first communiqué 50 only at one or more specified times of a day (e.g., between 8 AM to 6 PM) with respect to the receiving entity 30 (e.g., as determined by, for example, the receiving entity time determining module 206 based on the receiving entity data 55 provided by receiving entity 30).

In still other cases, operation 410 may include an operation 412 for intercepting the first communiqué only at one or more specified times of a calendar year with respect to the receiving entity as further depicted in FIG. 4a. For instance, the communiqué intercepting module 202 including the receiving entity time determining module 206 of the network device 10 intercepting the first communiqué 50 only at one or more specified times of a calendar year (e.g., December 24 and 25) with respect to the receiving entity 30 (e.g., as determined by, for example, the receiving entity time determining module 206).

In some cases, operation 407 for intercepting the first communiqué 50 may include an operation 413 for intercepting the first communiqué as a function of one or more environmental conditions of the receiving entity as depicted in FIG. 4a. For instance, the communiqué intercepting module 202 of the network device 10 intercepting the first communiqué 50 as a function of one or more environmental conditions (e.g., presence or absence of a particular third party) of the receiving entity 30. For example, conditionally intercepting the first communiqué 50 when the receiving entity 30, which includes a human receiving user 32, is in the presence of a spouse. The determination of whether the spouse is present may be based on receiving entity data 55 that may be provided by the receiving entity 30 via, for example, microblogs (e.g., tweeting) or by other means.

In some implementations, operation 413 may further include an operation 414 for intercepting the first communiqué in response to determining occurrence of at least one specified environmental condition associated with the receiving entity as further depicted in FIG. 4a. For instance, the communiqué intercepting module 202 including the receiving entity environmental condition determining module 208 (see FIG. 2a) of the network device 10 intercepting the first communiqué 50 in response to the receiving entity environmental condition determining module 208 determining occurrence of at least one specified environmental condition (e.g., presence or absence of a particular third party in the vicinity of the receiving entity 30) associated with the receiving entity 30.

In some implementations, the operation 407 for intercepting the first communiqué may include an operation 415 for intercepting the first communiqué in response to at least determining that the first communiqué includes data that associates the first communiqué with the source entity as depicted in FIG. 4b. For instance, the communiqué intercepting module 202 including the source entity association determining module 210 (see FIG. 2a) of the network device 10 intercepting the first communiqué 50 in response to the source entity association determining module 210 at least determining that the first communiqué 50 includes data that associates the first communiqué 50 with the source entity 20 (e.g., the first communiqué 50 include data that at least identifies the source entity 20).

In various implementations, the operation 415 for intercepting the first communiqué in response to at least determining that the first communiqué includes data that associates the first communiqué with the source entity may further include one or more additional operations. For example, in some implementations, operation 415 may include an operation 416 for intercepting the first communiqué in response to at least determining that the first communiqué includes header data that associates the source entity with the first communiqué as further depicted in FIG. 4b. For instance, the communiqué intercepting module 202 including the source entity association determining module 210 of the network device 10 intercepting the first communiqué 50 in response to the source entity association determining module 210 at least determining that the first communiqué 50 includes header data that associates (e.g., references, indicates, refers to, and so forth) the source entity 20 with the first communiqué 50. For example, determining that the first communiqué 50 include header data that identifies the source entity 20 as the sender of the first communiqué 50. In some cases, such header data may also include other information such as the destination (e.g., address) for the first communiqué 50, destination address, receiver identity, subject heading, route or path to take to the destination, and so forth.

In the same or different implementations, operation 415 may include an operation 417 for intercepting the first communiqué in response to at least determining that the first communiqué includes metadata that associates the source entity with the first communiqué as further depicted in FIG. 4b. For instance, the communiqué intercepting module 202 including the source entity association determining module 210 of the network device 10 intercepting the first communiqué 50 in response to the source entity association determining module 210 at least determining that the first communiqué 50 includes metadata that associates the source entity 20 with the first communiqué 50.

In the same or different implementations, operation 415 may include an operation 418 for intercepting the first communiqué in response to at least determining that the first communiqué includes message content data that associates the source entity with the first communiqué as depicted in FIG. 4b. For instance, the communiqué intercepting module 202 including the source entity association determining module 210 of the network device 10 intercepting the first communiqué 50 in response to the source entity association determining module 210 at least determining that the first communiqué 50 includes message content data (e.g., image data, voice signature data, textual data, and/or other types of data that include representations of the source entity 20 including, for example, names, addresses, images, and/or audio signatures associated with the source entity 20) that associates the source entity 20 with the first communiqué 50.

In the same or different implementations, operation 415 may include an operation 419 for intercepting the first communiqué in response to at least determining that the first communiqué includes one or more representations of the source entity as further depicted in FIG. 4b. For instance, the communiqué intercepting module 202 including the source entity representation determining module 212 (see FIG. 2a) of the network device 10 intercepting the first communiqué 50 in response to the source entity representation determining module 212 at least determining that the first communiqué 50 includes one or more representations of the source entity 20. A "representation" of a source entity 20 may be any type of identifier that can be used to identify the source entity 20 including, for example, names, addresses (e.g., email or URL addresses), telephone numbers, images, voice signatures, and so forth associated with the source entity 20.

In some cases, operation 419 may, in turn, include an operation 420 for intercepting the first communiqué in response to at least determining that the first communiqué includes at least one of a name, an address, a telephone number, an image, or a voice signature associated with the source entity as depicted in FIG. 4b. For instance, the communiqué intercepting module 202 including the source entity representation determining module 212 (see FIG. 2a) of the network device 10 intercepting the first communiqué 50 in response to the source entity representation determining module 212 at least determining that the first communiqué 50 includes data that indicates at least one of a name, an address, a telephone number, an image, or a voice signature associated with the source entity 20.

In some implementations, the operation 407 for intercepting the first communiqué may include an operation 421 for intercepting the first communiqué in response to at least determining that the first communiqué is directed to the receiving entity as depicted in FIG. 4c. For instance, the communiqué intercepting module 202 including the receiving entity directed determining module 214 intercepting the first communiqué 50 in response to the receiving entity directed determining module 214 at least determining that the first communiqué 50 is directed to the receiving entity 30 (e.g., a receiving user 32 who may be a human or robotic user and/or a receiving user device 34). A variety of approaches may be employed in various alternative implementations in order to determine that the first communiqué 50 was directed to the receiving entity 30.

For example, in some implementations, operation 421 may include an operation 422 for intercepting the first communiqué in response to at least determining that the first communiqué is directed to a representation of the receiving entity as depicted in FIG. 4c. For instance, the communiqué intercepting module 202 including the receiving entity representation directed determining module 216 intercepting the first communiqué 50 in response to the receiving entity representation directed determining module 216 at least determining that the first communiqué 50 is directed to a representation (e.g., an address, a name, or other identifiers) of the receiving entity 30.

Operation 422, in turn, may further include an operation 423 for intercepting the first communiqué in response to at least determining that the first communiqué is directed to an address associated with the receiving entity as depicted in FIG. 4c. For instance, the communiqué intercepting module 202 including the receiving entity address directed determining module 218 (see FIG. 2a) of the network device 10 of FIG. 1b intercepting the first communiqué 50 in response to the receiving entity address directed determining module 218 at least determining that the first communiqué 50 is directed to an address associated with the receiving entity 30.

In some implementations, operation 423 may further include an operation 424 for intercepting the first communiqué in response to at least determining that the first communiqué is directed to at least one of an email address, an Internet Protocol (IP) address, or a Uniform Resource Locator (URL) associated with the receiving entity as depicted in FIG. 4c. For instance, the communiqué intercepting module 202 including the receiving entity address directed determining module 218 of the network device 10 intercepting the first communiqué 50 in response to the receiving entity address directed determining module 218 at least determining that the first communiqué 50 is directed to at least one of an email address, an Internet Protocol (IP) address, or a Uniform Resource Locator (URL) associated with the receiving entity 30.

In various implementations, the operation 422 for intercepting the first communiqué in response to at least determining that the first communiqué is directed to a representation of the receiving entity may include an operation 425 for intercepting the first communiqué in response to at least determining that the first communiqué is directed to a telephone number associated with the receiving entity as further depicted in FIG. 4c. For instance, the communiqué intercepting module 202 including the receiving entity telephone number directed determining module 220 (see FIG. 2a) of the network device 10 of FIG. 1b intercepting the first communiqué 50 in response to the receiving entity telephone number directed determining module 220 at least determining that the first communiqué 50 (e.g., a telephone call) is directed to a telephone number associated with the receiving entity 30.

In the same or different implementations, operation 422 may include an operation 426 for intercepting the first communiqué in response to at least determining that the first communiqué is directed to a name associated with the receiving entity as depicted in FIG. 4c. For instance, the communiqué intercepting module 202 including the receiving entity name directed determining module 222 (see FIG. 2a) of the network device 10 of FIG. 1b intercepting the first communiqué 50 in response to the receiving entity name directed determining module 222 at least determining that the first communiqué 50 is directed to a name (e.g., username) associated with the receiving entity 30.

In some cases, the operation 407 for intercepting the first communiqué 50 may include an operation 427 for intercepting the first communiqué in response to at least determining that the first communiqué is associated with the source entity and is directed to the receiving entity as depicted in FIG. 4c.

For instance, the communiqué intercepting module 202 including the source entity association determining module 210 and the receiving entity directed determining module 214 of the network device 10 of FIG. 1b intercepting the first communiqué 50 in response to the source entity association determining module 210 and the receiving entity directed determining module 214 at least respectively determining that the first communiqué 50 is associated with the source entity 20 and is directed to the receiving entity 30.

Operation 427, in turn, may further include an operation 428 for intercepting the first communiqué in further response to determining that the first communiqué include a subject heading that include one or more specified words or phrases that prompts the conditional obfuscation of the identity of the source entity as further depicted in FIG. 4c. For instance, the communiqué intercepting module 202 including the subject heading determining module 224 (see FIG. 2b) of the network device 10 intercepting the first communiqué 50 in further response to the subject heading determining module 224 determining that the first communiqué 50 include a subject heading (e.g., such as a subject heading indicated by header data or by metadata) that include one or more specified words or phrases that prompts the conditional obfuscation of the identity of the source entity 20 (e.g., prompt the conditional interception of the first communiqué 50).

Figure 4D:
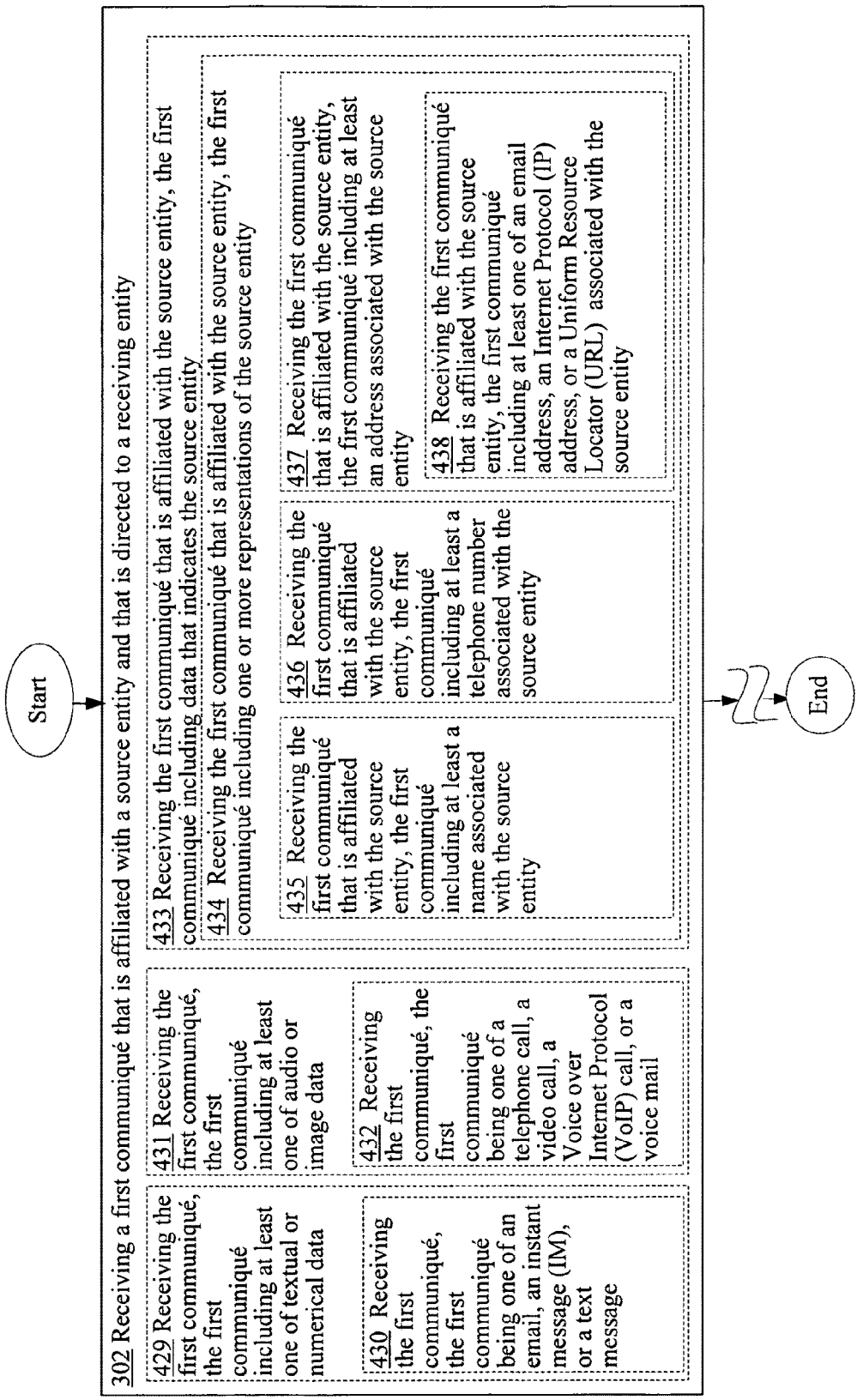
FIG. 4d is a high-level logic flowchart of a process depicting alternate implementations of the communiqué receiving operation 302 of FIG. 3.

Referring now to FIG. 4d, in various implementations the communiqué receiving operation 302 of FIG. 3 may include an operation 429 for receiving the first communiqué, the first communiqué including at least one of textual or numerical data. For instance, the communiqué receiving module 102 of the network device 10 of FIG. 1b receiving the first communiqué 50, the first communiqué 50 including at least one of textual or numerical data (e.g., alphanumeric data).

In some cases, operation 429 may include an operation 430 for receiving the first communiqué, the first communiqué being one of an email, an instant message (IM), or a text message as depicted in FIG. 4d. For instance, the communiqué receiving module 102 of the network device 10 receiving the first communiqué 50, the first communiqué 50 being one of an email, an instant message (IM), or a text message.

In various implementations, the communiqué receiving operation 302 of FIG. 3 may include an operation 431 for receiving the first communiqué, the first communiqué including at least one of audio or image data as further depicted in FIG. 4d. For instance, the communiqué receiving module 102 of the network device 10 receiving the first communiqué 50, the first communiqué 50 including at least one of audio or image data (e.g., digital still images or video/webcam-type images).

In some implementations, operation 431 may further include an operation 432 for receiving the first communiqué, the first communiqué being one of a telephone call, a video call, a Voice over Internet Protocol (VoIP) call, or a voice mail as depicted in FIG. 4d. For instance, the communiqué receiving module 102 of the network device 10 receiving the first communiqué 50, the first communiqué 50 being one of a telephone call, a video call, a Voice over Internet Protocol (VoIP) call, or a voice mail.

In some cases, the communiqué receiving operation 302 of FIG. 3 may include an operation 433 for receiving the first communiqué that is affiliated with the source entity, the first communiqué including data that indicates the source entity as depicted in FIG. 4d. For instance, the communiqué receiving module 102 of the network device 10 receiving the first communiqué 50 that is affiliated with the source entity 20, the first communiqué 50 being affiliated with the source entity 20 by having data that identifies the source entity 20.

As further illustrated in FIG. 4d, operation 433 may further include one or more additional operations in various alternative implementations. For example, in some implementations, operation 433 may further include an operation 434 for receiving the first communiqué that is affiliated with the source entity, the first communiqué including one or more representations of the source entity as depicted in FIG. 4d. For instance, the communiqué receiving module 102 of the network device 10 receiving the first communiqué 50 that is affiliated with the source entity 20, the first communiqué 50 including one or more representations (e.g., one or more of names, addresses, telephone numbers, images, voice signatures, and/or other identifiers associated with the source entity 20) of the source entity 20.

Operation 434 may, in turn, include one or more additional operations in some alternative implementations. For example, in some cases, operation 434 may further include an operation 435 for receiving the first communiqué that is affiliated with the source entity, the first communiqué including at least a name associated with the source entity as further depicted in FIG. 4d. For instance, the communiqué receiving module 102 of the network device 10 receiving the first communiqué 50 that is affiliated with the source entity 20, the first communiqué 50 including at least a name (e.g., username) associated with the source entity 20.

In the same or different implementations, operation 434 may include an operation 436 for receiving the first communiqué that is affiliated with the source entity, the first communiqué including at least a telephone number associated with the source entity as depicted in FIG. 4d. For instance, the communiqué receiving module 102 of the network device 10 receiving the first communiqué 50 that is affiliated with the source entity 20, the first communiqué 50 including at least a telephone number associated with the source entity 20.

In the same or different implementations, operation 434 may include an operation 437 for receiving the first communiqué that is affiliated with the source entity, the first communiqué including at least an address associated with the source entity as depicted in FIG. 4d. For instance, the communiqué receiving module 102 of the network device 10 receiving the first communiqué 50 that is affiliated with the source entity 20, the first communiqué 50 including at least an address associated with the source entity 20.

In some cases, operation 437 may further include an operation 438 for receiving the first communiqué that is affiliated with the source entity, the first communiqué including at least one of an email address, an Internet Protocol (IP) address, or a Uniform Resource Locator (URL) associated with the source entity as depicted in FIG. 4d. For instance, the communiqué receiving module 102 of the network device 10 receiving the first communiqué 50 that is affiliated with the source entity 20, the first communiqué 50 including at least one of an email address, an Internet Protocol (IP) address, or a Uniform Resource Locator (URL) associated with the source entity 20.

Figure 4E:
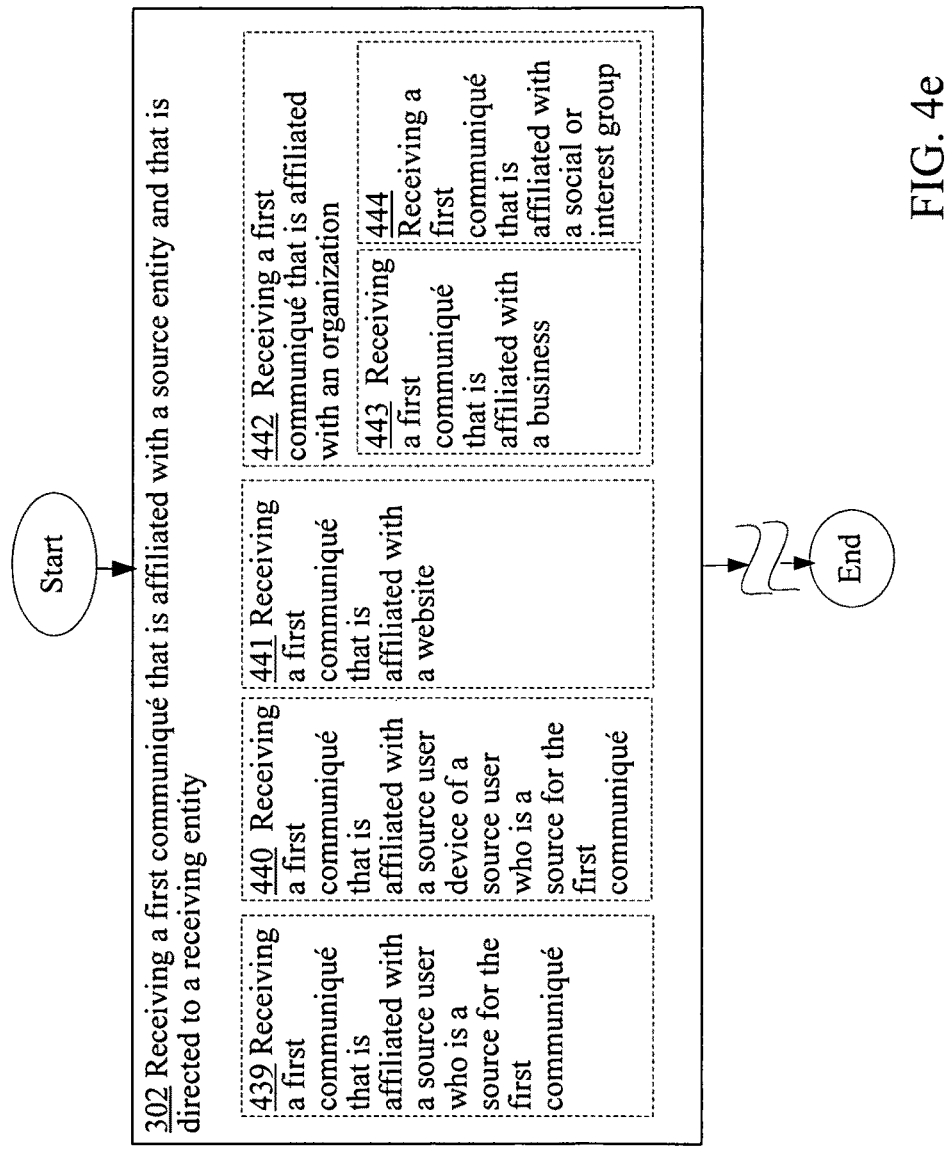
FIG. 4e is a high-level logic flowchart of a process depicting alternate implementations of the communiqué receiving operation 302 of FIG. 3.

In various implementations, the communiqué receiving operation 302 of FIG. 3 may include an operation 439 for receiving a first communiqué that is affiliated with a source user who is a source for the first communiqué as depicted in FIG. 4e. For instance, the communiqué receiving module 102 of the network device 10 receiving a first communiqué 50 that is affiliated with a source user 22 who is a source for the first communiqué 50. A source user 22 may be the source for the first communiqué 50 when, for example, the source user 22 is the original composer or author for the first communiqué 50. Alternatively, a source user 22 may be the source for the first communiqué 50 when the source user 22 is merely an intermediate or indirect source that is passing along the first communiqué 50 from an original source.

In the same or different implementations, the communiqué receiving operation 302 may include an operation 440 for receiving a first communiqué that is affiliated with a source user device of a source user who is a source for the first communiqué as further depicted in FIG. 4e. For instance, the communiqué receiving module 102 of the network device 10 receiving a first communiqué 50 that is affiliated with a source user device 24 of a source user 22 (e.g., a human or a robotic user) who is a source for the first communiqué 50.

In the same or different implementations, the communiqué receiving operation 302 may include an operation 441 for receiving a first communiqué that is affiliated with a website as further depicted in FIG. 4e. For instance, the communiqué receiving module 102 of the network device 10 receiving a first communiqué 50 that is affiliated with a website (e.g., the first communiqué 50 includes data that indicate that a website was the source for the first communiqué 50).

In the same or different implementations, the communiqué receiving operation 302 may include an operation 442 for receiving a first communiqué that is affiliated with an organization as further depicted in FIG. 4e. For instance, the communiqué receiving module 102 of the network device 10 receiving a first communiqué 50 that is affiliated with an organization (e.g., the communiqué receiving module 102 receiving a first communiqué 50 that includes data that indicate that an organization was the source for the first communiqué 50).

In some cases, operation 442 may include an operation 443 for receiving a first communiqué that is affiliated with a business as depicted in FIG. 4e. For instance, the communiqué receiving module 102 of the network device 10 receiving a first communiqué 50 that is affiliated with a business (e.g., the communiqué receiving module 102 receiving a first communiqué 50 that includes data that indicate that a business was the source for the first communiqué 50).

In the same or different implementations, operation 442 may include an operation 444 for receiving a first communiqué that is affiliated with a social or interest group as depicted in FIG. 4e. For instance, the communiqué receiving module 102 of the network device 10 receiving a first communiqué 50 that is affiliated with a social or interest group (e.g., the communiqué receiving module 102 receiving a first communiqué 50 that includes data that indicate that a social or interest group was the source for the first communiqué 50).

Figure 4F:
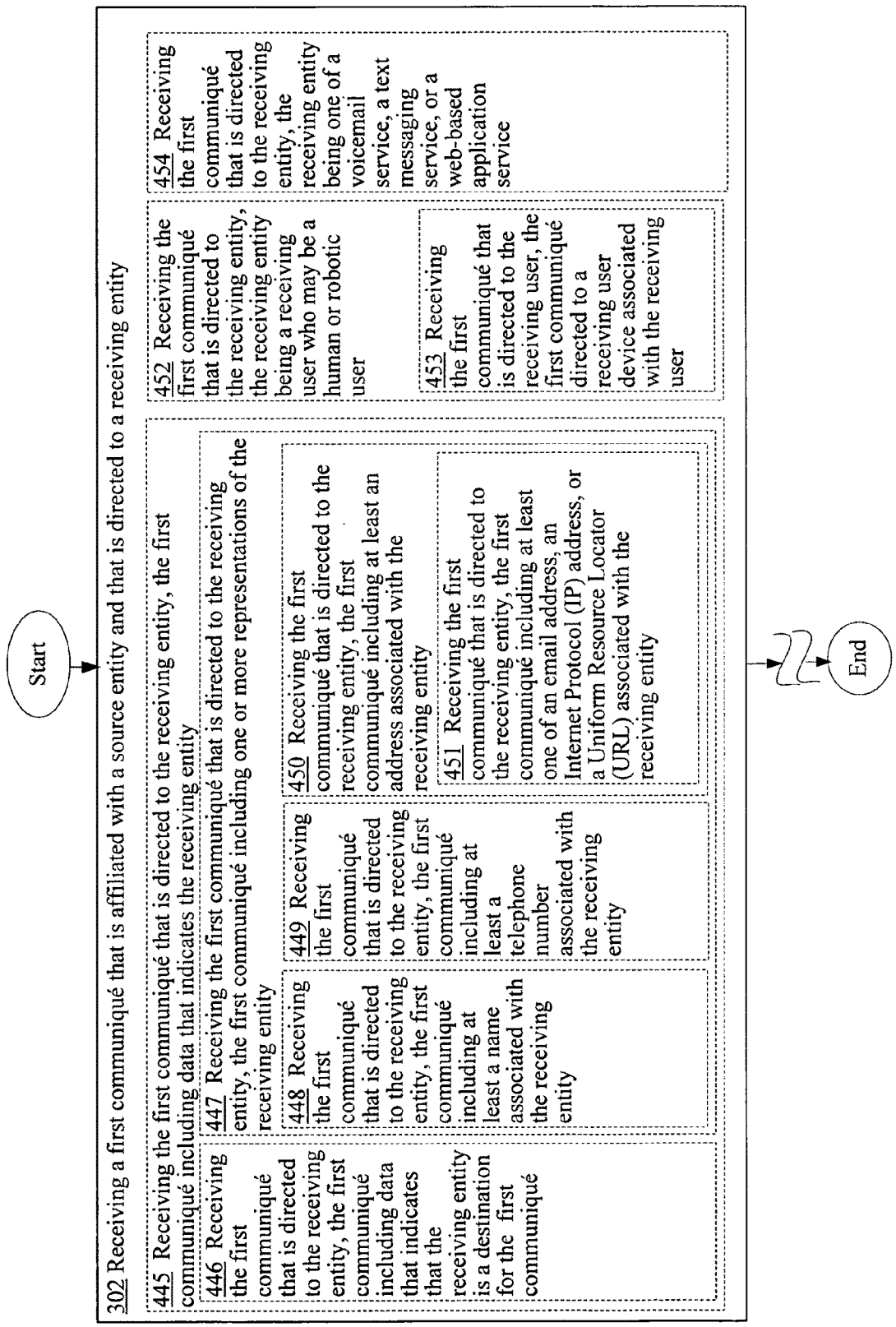
FIG. 4f is a high-level logic flowchart of a process depicting alternate implementations of the communiqué receiving operation 302 of FIG. 3.

In various implementations, the communiqué receiving operation 302 of FIG. 3 may include an operation 445 for receiving the first communiqué that is directed to the receiving entity, the first communiqué including data that indicates the receiving entity as depicted in FIG. 4f. For instance, the communiqué receiving module 102 of the network device 10 of FIG. 3 receiving the first communiqué 50 that is directed to the receiving entity 30, the first communiqué 50 including data (e.g., header data or metadata) that indicates the receiving entity 30. For example, the first communiqué 50 may include data that identifies the receiving entity 30 as the destination for the first communiqué 50. In various implementations, the receiving entity 30 may comprise a receiving user 32 who may be a human or robotic user and/or a receiving user device 34 (e.g., laptop, workstation, smartphone, and so forth) associated with the receiving user 32. In some alternative implementations, the receiving entity 30 may be a voicemail service, a text messaging service, a web-based application service, and so forth.

As illustrated in FIG. 4f, operation 445 may further include one or more additional operations in various alternative implementations. For example, in some implementations, operation 445 may further include an operation 446 for receiving the first communiqué that is directed to the receiving entity, the first communiqué including data that indicates that the receiving entity is a destination for the first communiqué as depicted in FIG. 4f. For instance, the communiqué receiving module 102 of the network device 10 receiving the first communiqué 50 that is directed to the receiving entity 30, the first communiqué 50 including data that indicates that the receiving entity 30 is a destination for the first communiqué 50.

In the same or different implementations, operation 445 may include an operation 447 for receiving the first communiqué that is directed to the receiving entity, the first communiqué including one or more representations of the receiving entity as further depicted in FIG. 4f. For instance, the communiqué receiving module 102 of the network device 10 receiving the first communiqué 50 that is directed to the receiving entity 30, the first communiqué 50 including one or more representations of the receiving entity 30.

In some implementations, operation 447 may include an operation 448 for receiving the first communiqué that is directed to the receiving entity, the first communiqué including at least a name associated with the receiving entity as further depicted in FIG. 4f. For instance, the communiqué receiving module 102 of the network device 10 receiving the first communiqué 50 that is directed to the receiving entity 30, the first communiqué 50 including at least a name associated with the receiving entity 30.

In the same or different implementations, operation 447 may include an operation 449 for receiving the first communiqué that is directed to the receiving entity, the first communiqué including at least a telephone number associated with the receiving entity as further depicted in FIG. 4f. For instance, the communiqué receiving module 102 of the network device 10 receiving the first communiqué 50 that is directed to the receiving entity 30, the first communiqué 50 including at least a telephone number associated with the receiving entity 30.

In the same or different implementations, operation 447 may include an operation 450 for receiving the first communiqué that is directed to the receiving entity, the first communiqué including at least an address associated with the receiving entity as further depicted in FIG. 4f. For instance, the communiqué receiving module 102 of the network device 10 receiving the first communiqué 50 that is directed to the receiving entity 30, the first communiqué 50 including at least an address (e.g., an address in the form of, for example, header data or metadata) associated with the receiving entity 30.

Various types of addresses may be included in the first communiqué 50 received through operation 450. For example, in some cases, operation 450 may further include an operation 451 for receiving the first communiqué that is directed to the receiving entity, the first communiqué including at least one of an email address, an Internet Protocol (IP) address, or a Uniform Resource Locator (URL) associated with the receiving entity as further depicted in FIG. 4f. For instance, the communiqué receiving module 102 of the network device 10 receiving the first communiqué 50 that is directed to the receiving entity 30, the first communiqué 50 including at least one of an email address, an Internet Protocol (IP) address, or a Uniform Resource Locator (URL) associated with the receiving entity 30.

The first communiqué to be received through the communiqué receiving operation 302 of FIG. 3 may be directed to any one or more of a variety of receiving entities. For example, the communiqué receiving operation 302 in some implementations may include an operation 452 for receiving the first communiqué that is directed to the receiving entity, the receiving entity being a receiving user who may be a human or robotic user as depicted in FIG. 4f. For instance, the communiqué receiving module 102 of the network device 10 receiving the first communiqué 50 that is directed to the receiving entity 30, the receiving entity 30 being a receiving user 32 who may be a human or robotic user.

In some cases, operation 452 may further include an operation 453 for receiving the first communiqué that is directed to the receiving user, the first communiqué directed to a receiving user device associated with the receiving user as further depicted in FIG. 4f. For instance, the communiqué receiving module 102 of the network device 10 receiving the first communiqué 50 that is directed to the receiving user 30, the first communiqué 50 directed to a receiving user device 34 associated with the receiving user 32.

In some implementations, the communiqué receiving operation 302 may include an operation 454 for receiving the first communiqué that is directed to the receiving entity, the receiving entity being one of a voicemail service, a text messaging service, or a web-based application service as depicted in FIG. 4f. For instance, the communiqué receiving module 102 of the network device 10 receiving the first communiqué 50 that is directed to the receiving entity 30, the receiving entity 30 being one of a voicemail service, a text messaging service, or a web-based application service.

Figure 5A:
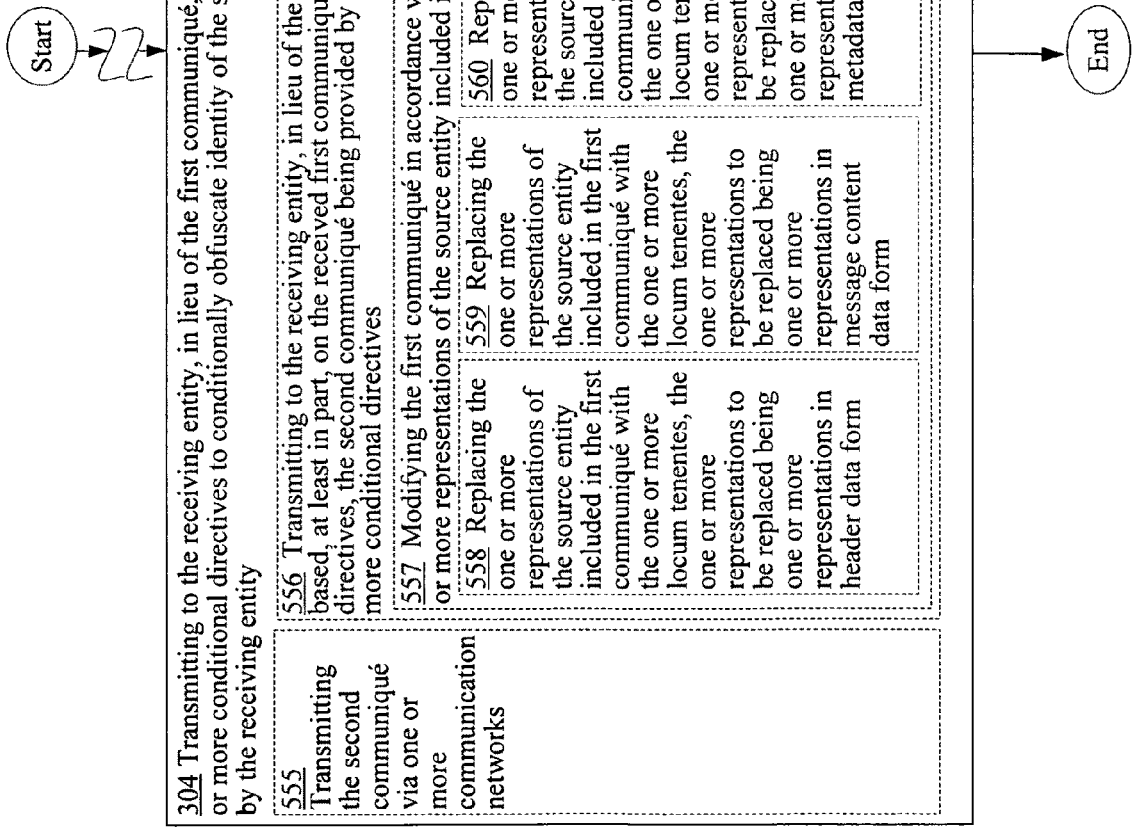
FIG. 5a is a high-level logic flowchart of a process depicting alternate implementations of the communiqué transmitting operation 304 of FIG. 3.

Referring back to the communiqué transmitting operation 304 of FIG. 3, the communiqué transmitting operation 304 similar to the communiqué receiving operation 302 of FIG. 3 may be executed in a number of different ways in various alternative implementations as illustrated in FIGS. 5a, 5b, 5c, 5d, 5e, 5f, 5g, 5h, and 5i. For example, in some implementations, the communiqué transmitting operation 304 of FIG. 3 may include an operation 555 for transmitting the second communiqué via one or more communication networks as depicted in FIG. 5a. For instance, the communiqué transmitting module 104 of the network device 10 of FIG. 1b transmitting the second communiqué 52 via one or more communication networks 40 (e.g., WLAN, WMAN, WiMAX, PTSN, VoIP network, cellular network, Client/Server Network, virtual private network, and so forth).

In some cases, the communiqué transmitting operation 304 of FIG. 3 may include the transmission of a second communiqué 52 that was derived based on the modification of the first communiqué 50 received through the communiqué receiving operation 302 of FIG. 3. For example, in some implementations, the communiqué transmitting operation 304 may include an operation 556 for transmitting to the receiving entity, in lieu of the first communiqué, the second communiqué that is provided based, at least in part, on the received first communiqué and in accordance with the one or more conditional directives, the second communiqué being provided by modifying the first communiqué in accordance with the one or more conditional directives as depicted in FIG. 5a. For instance, the communiqué transmitting module 104 including the communiqué modifying module 226 (see FIG. 2b) of the network device 10 transmitting to the receiving entity 30, in lieu of the first communiqué 50, the second communiqué 52 that is provided based, at least in part, on the received first communiqué 50 and in accordance with the one or more conditional directives 54, the second communiqué 52 being provided by the communiqué modifying module 226 modifying (e.g., revising or editing) the first communiqué 50 in accordance with the one or more conditional directives 54 in order to, for example, conditionally obfuscate identity of the source entity 20 affiliated with the first communiqué 50.

In order to provide for the second communiqué 52, the first communiqué 50 may be modified in a variety of different ways in various alternative implementations. For example, in some cases, operation 556 may include an operation 557 for modifying the first communiqué in accordance with the one or more conditional directives by replacing one or more representations of the source entity included in the first communiqué with one or more locum tenentes as depicted in FIG. 5a. For instance, the communiqué modifying module 226 including the representation replacing module 228 (see FIG. 2b) of the network device 10 of FIG. 1b modifying the first communiqué 50 in accordance with the one or more conditional directives 54 by having the representation replacing module 228 replacing one or more representations (e.g., one or more of names, addresses, images, voice signatures, and/or other identifiers) of the source entity 20 included in the first communiqué 50 with one or more locum tenentes (e.g., substitutes, placeholders, and so forth). Note that the singular version of "locum tenentes" is "locum tenens."

In various implementations, a locum tenens may be a purely fictional substitute (e.g., a substitute that is an imagined substitute) or an authentic or non-fictional substitute (e.g., a substitute that is a genuine representation of another entity). For example, if the representation to be replaced is a phone number associated with the source entity 20, than the phone number may be replaced with a fictional substitute (e.g., a completely fake or fictional phone number) or a non-fictional substitute (e.g., a phone number belonging to a third party entity). Note that when one or more non-fictional substitutes are used to replace one or more representations of the source entity 20 included in the first communiqué 50, an additional operation may be needed in order to at least confidentially alert the receiving entity 30 of the obfuscation of the source entity 20.

In addition to being fictional or non-fictional, a locum tenens may also be a direct or indirect substitute. A direct substitute is a substitute that is the same type of representation as the representation being replaced. For example, if the representation to be replaced is a name of a person, than a direct substitute for such a representation would be a name of another person. On the other hand, if the representation (e.g., name of a person) is to be replaced by a locum tenens that is an indirect substitute, than the indirect substitute to be used may be a name of a business, a name of an animal or any other substitute representation that is a different type representation from the representation being replaced.

Various types of representations of the source entity 20 may be replaced in operation 557 in various alternative implementations. For example, in some implementations, operation 557 may include an operation 558 for replacing the one or more representations of the source entity included in the first communiqué with the one or more locum tenentes, the one or more representations to be replaced being one or more representations in header data form as further depicted in FIG. 5a. For instance, the representation replacing module 228 of the network device 10 replacing the one or more representations of the source entity 20 included in the first communiqué 50 with the one or more locum tenentes, the one or more representations to be replaced being one or more representations in header data form.

In the same or different implementations, operation 557 may include an operation 559 for replacing the one or more representations of the source entity included in the first communiqué with the one or more locum tenentes, the one or more representations to be replaced being one or more representations in message content data form as depicted in FIG. 5a. For instance, the representation replacing module 228 of the network device 10 replacing the one or more representations of the source entity 20 included in the first communiqué 50 with the one or more locum tenentes, the one or more representations to be replaced being one or more representations in message content data form.

In the same or different implementations, operation 557 may include an operation 560 for replacing the one or more representations of the source entity included in the first communiqué with the one or more locum tenentes, the one or more representations to be replaced being one or more representations in metadata form as depicted in FIG. 5a. For instance, the representation replacing module 228 of the network device 10 replacing the one or more representations of the source entity 20 included in the first communiqué 50 with the one or more locum tenentes, the one or more representations to be replaced being one or more representations in metadata form.

In the same or different implementations, operation 557 may include an operation 561 for replacing the one or more representations of the source entity included in the first communiqué with the one or more locum tenentes by replacing one or more names associated with the source entity that are included in the first communiqué with one or more substitutes as further depicted in FIG. 5a. For instance, the representation replacing module 228 including the name replacing module 230 (see FIG. 2b) of the network device 10 replacing the one or more representations of the source entity 20 included in the first communiqué 50 with the one or more locum tenentes by having the name replacing module 230 replacing one or more names (e.g., usernames, actual given names, website names, business or organization names, and so forth) associated with the source entity 20 that are included in the first communiqué 50 with one or more substitutes (e.g., substitute names).

In the same or different implementations, operation 557 may include an operation 562 for replacing the one or more representations of the source entity included in the first communiqué with the one or more locum tenentes by replacing one or more telephone numbers associated with the source entity that are included in the first communiqué with one or more substitutes as depicted in FIG. 5a. For instance, the representation replacing module 228 including the telephone number replacing module 232 (see FIG. 2b) of the network device 10 replacing the one or more representations of the source entity 20 included in the first communiqué 50 with the one or more locum tenentes by having the telephone number replacing module 232 replacing one or more telephone numbers associated with the source entity 20 that are included in the first communiqué 50 with one or more substitutes (e.g., one or more fictional or non-fictional substitute telephone numbers).

Figure 5B:
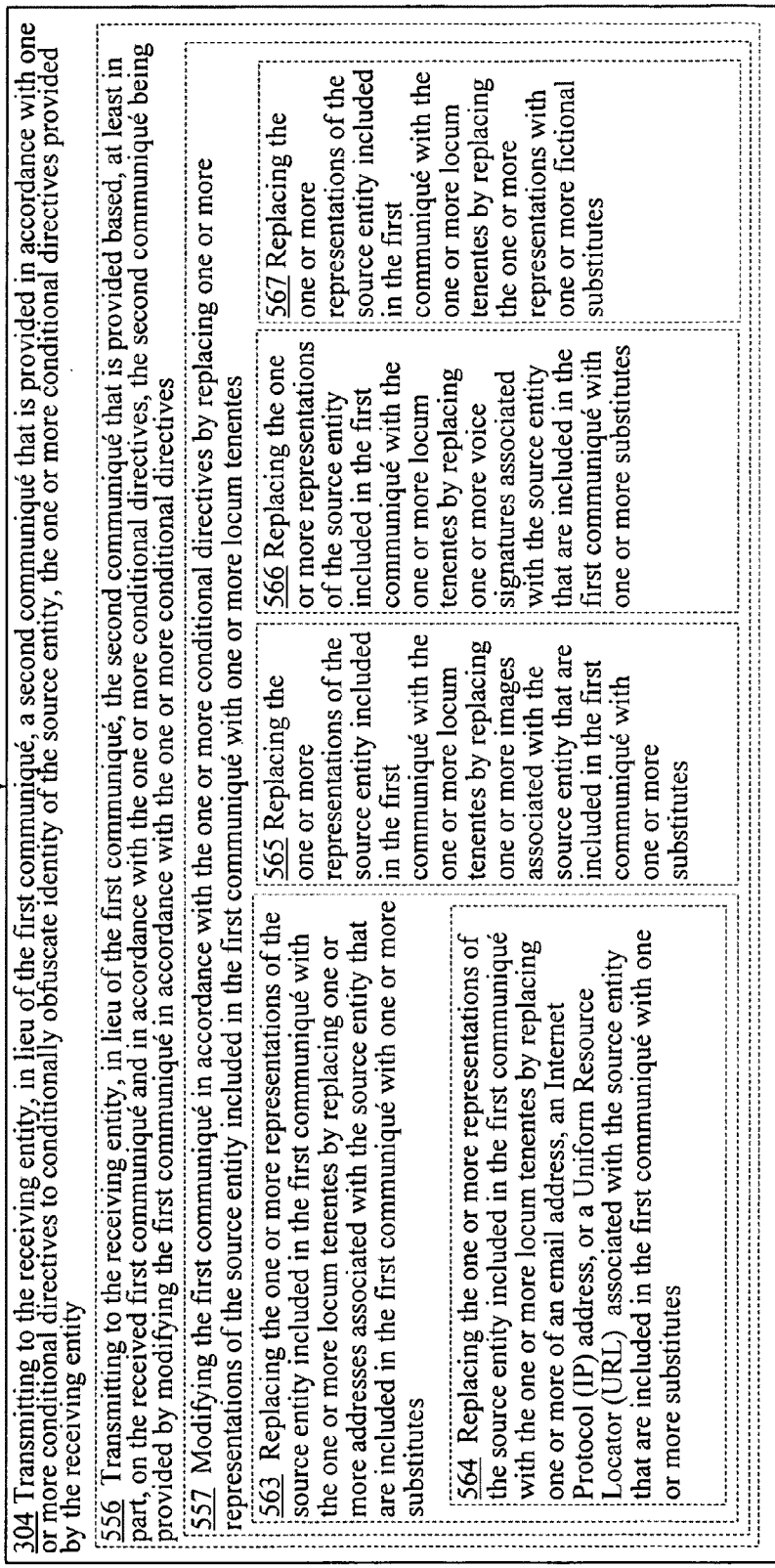
FIG. 5b is a high-level logic flowchart of a process depicting alternate implementations of the communiqué transmitting operation 304 of FIG. 3.

In the same or different implementations, operation 557 may include an operation 563 for replacing the one or more representations of the source entity included in the first communiqué with the one or more locum tenentes by replacing one or more addresses associated with the source entity that are included in the first communiqué with one or more substitutes as depicted in FIG. 5b. For instance, the representation replacing module 228 including the address replacing module 234 (see FIG. 2b) of the network device 10 replacing the one or more representations of the source entity 20 included in the first communiqué 50 with the one or more locum tenentes by having the address replacing module 234 replacing one or more addresses associated with the source entity 20 that are included in the first communiqué 50 with one or more substitutes.

In some cases, operation 563 may further include an operation 564 for replacing the one or more representations of the source entity included in the first communiqué with the one or more locum tenentes by replacing one or more of an email address, an Internet Protocol (IP) address, or a Uniform Resource Locator (URL) associated with the source entity that are included in the first communiqué with one or more substitutes as further depicted in FIG. 5b. For instance, the representation replacing module 228 including the address replacing module 234 (see FIG. 2b) of the network device 10 replacing the one or more representations of the source entity 20 included in the first communiqué 50 with the one or more locum tenentes by having the address replacing module 234 replacing one or more of an email address, an Internet Protocol (IP) address, or a Uniform Resource Locator (URL) associated with the source entity 20 that are included in the first communiqué 50 with one or more substitutes.

In the same or different implementations, operation 557 may include an operation 565 for replacing the one or more representations of the source entity included in the first communiqué with the one or more locum tenentes by replacing one or more images associated with the source entity that are included in the first communiqué with one or more substitutes as further depicted in FIG. 5b. For instance, the representation replacing module 228 including the image replacing module 236 (see FIG. 2b) of the network device 10 replacing the one or more representations of the source entity 20 included in the first communiqué 50 with the one or more locum tenentes by having the image replacing module 236 replacing one or more images (e.g., iconic figures or digitized facial images) associated with the source entity 20 that are included in the first communiqué 50 with one or more substitutes (e.g., one or more substitute images).

In the same or different implementations, operation 557 may include an operation 566 for replacing the one or more representations of the source entity included in the first communiqué with the one or more locum tenentes by replacing one or more voice signatures associated with the source entity that are included in the first communiqué with one or more substitutes as further depicted in FIG. 5b. For instance, the representation replacing module 228 including the voice signature replacing module 238 (see FIG. 2b) of the network device 10 replacing the one or more representations of the source entity 20 included in the first communiqué 50 with the one or more locum tenentes by having the voice signature replacing module 238 replacing one or more voice signatures associated with the source entity 20 that are included in the first communiqué 50 with one or more substitutes (e.g. voice signatures).

A "voice signature," otherwise known as "voice biometrics," relates to the particular combination of characteristics associated with a person's voice that makes each person's voice distinctive. For example, a typical individual will have a voice with certain distinct characteristics (e.g., speech pattern, pitch, tone, rhythm, accent, and so forth) that make that individual's voice relatively unique. By changing the voice signature (e.g., modifying voice characteristics such as tone, pitch, and so forth) of an individual's voice, the voice may be disguised and the identity of the individual that the original voice belongs to may be obfuscated.

In the same or different implementations, operation 557 may include an operation 567 for replacing the one or more representations of the source entity included in the first communiqué with the one or more locum tenentes by replacing the one or more representations with one or more fictional substitutes as further depicted in FIG. 5b. For instance, the representation replacing module 228 of the network device 10 replacing the one or more representations of the source entity 20 included in the first communiqué 50 with the one or more locum tenentes by replacing the one or more representations with one or more fictional substitutes (e.g., replacing an email address of the source entity 20 with a fictional email address).

Figure 5C:
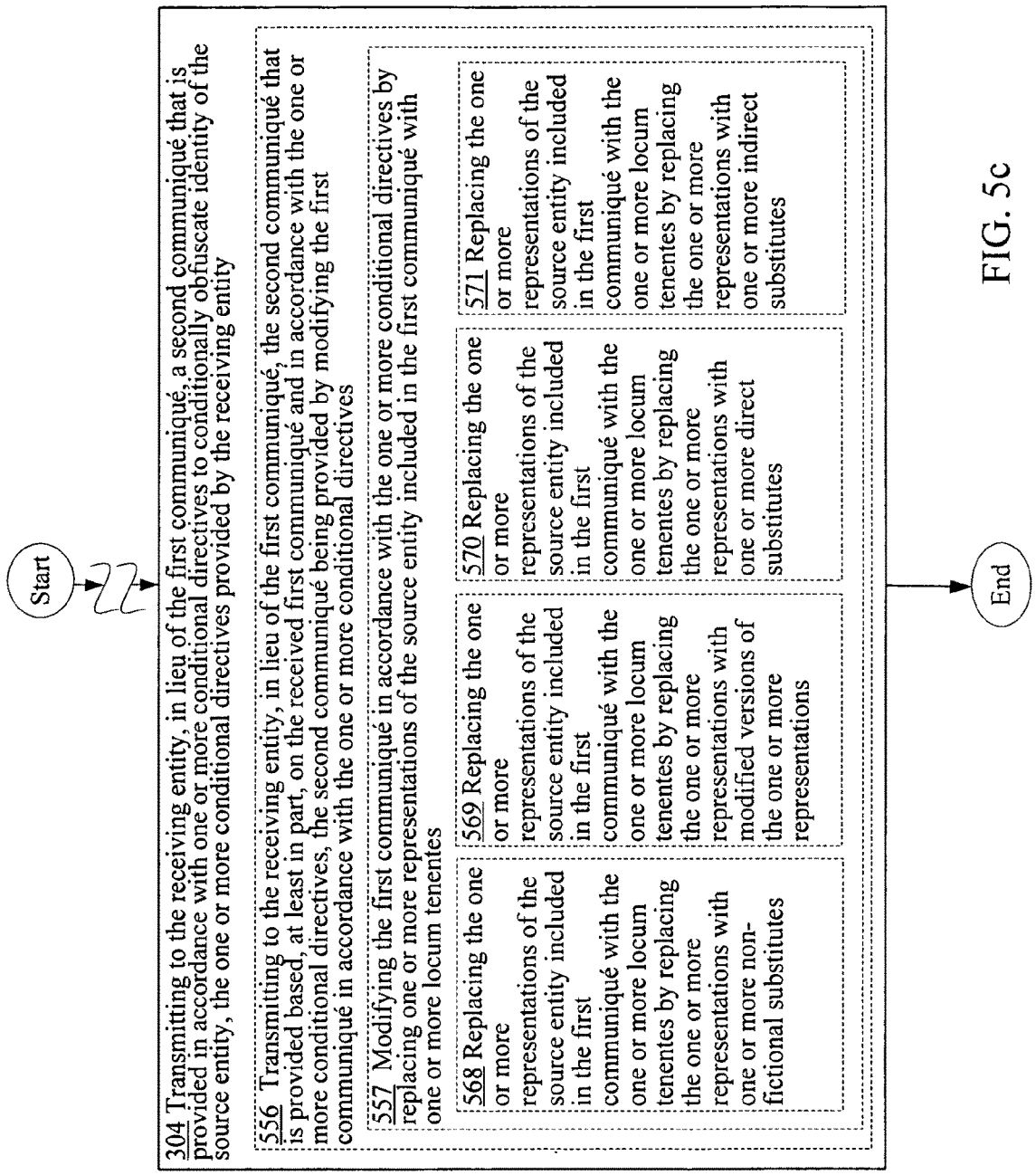
FIG. 5c is a high-level logic flowchart of a process depicting alternate implementations of the communiqué transmitting operation 304 of FIG. 3.

In the same or different implementations, operation 557 may include an operation 568 for replacing the one or more representations of the source entity included in the first communiqué with the one or more locum tenentes by replacing the one or more representations with one or more non-fictional substitutes as depicted in FIG. 5c. For instance, the representation replacing module 228 of the network device 10 replacing the one or more representations of the source entity 20 included in the first communiqué 50 with the one or more locum tenentes by replacing the one or more representations with one or more non-fictional substitutes (e.g., replacing a name associated with the source entity 20 with the actual name of another entity).

In the same or different implementations, operation 557 may include an operation 569 for replacing the one or more representations of the source entity included in the first communiqué with the one or more locum tenentes by replacing the one or more representations with modified versions of the one or more representations as depicted in FIG. 5c. For instance, the representation replacing module 228 of the network device 10 replacing the one or more representations of the source entity 20 included in the first communiqué 50 with the one or more locum tenentes by replacing the one or more representations with modified versions of the one or more representations (e.g., replacing a name associated with the source entity 20, such as "Carol," with a modified version of the original name, such as "Carl" or "David Carol").

In the same or different implementations, operation 557 may include an operation 570 for replacing the one or more representations of the source entity included in the first communiqué with the one or more locum tenentes by replacing the one or more representations with one or more direct substitutes as further depicted in FIG. 5c. For instance, the representation replacing module 228 of the network device 10 replacing the one or more representations of the source entity 20 included in the first communiqué 50 with the one or more locum tenentes by replacing the one or more representations (e.g., one or more images) with one or more direct substitutes (e.g., one or more substitute images).

In the same or different implementations, operation 557 may include an operation 571 for replacing the one or more representations of the source entity included in the first communiqué with the one or more locum tenentes by replacing the one or more representations with one or more indirect substitutes as further depicted in FIG. 5c. For instance, the representation replacing module 228 of the network device 10 replacing the one or more representations of the source entity 20 included in the first communiqué 50 with the one or more locum tenentes by replacing the one or more representations (e.g., one or more addresses) with one or more indirect substitutes (e.g., one or more fictional substitute names).

Figure 5D:
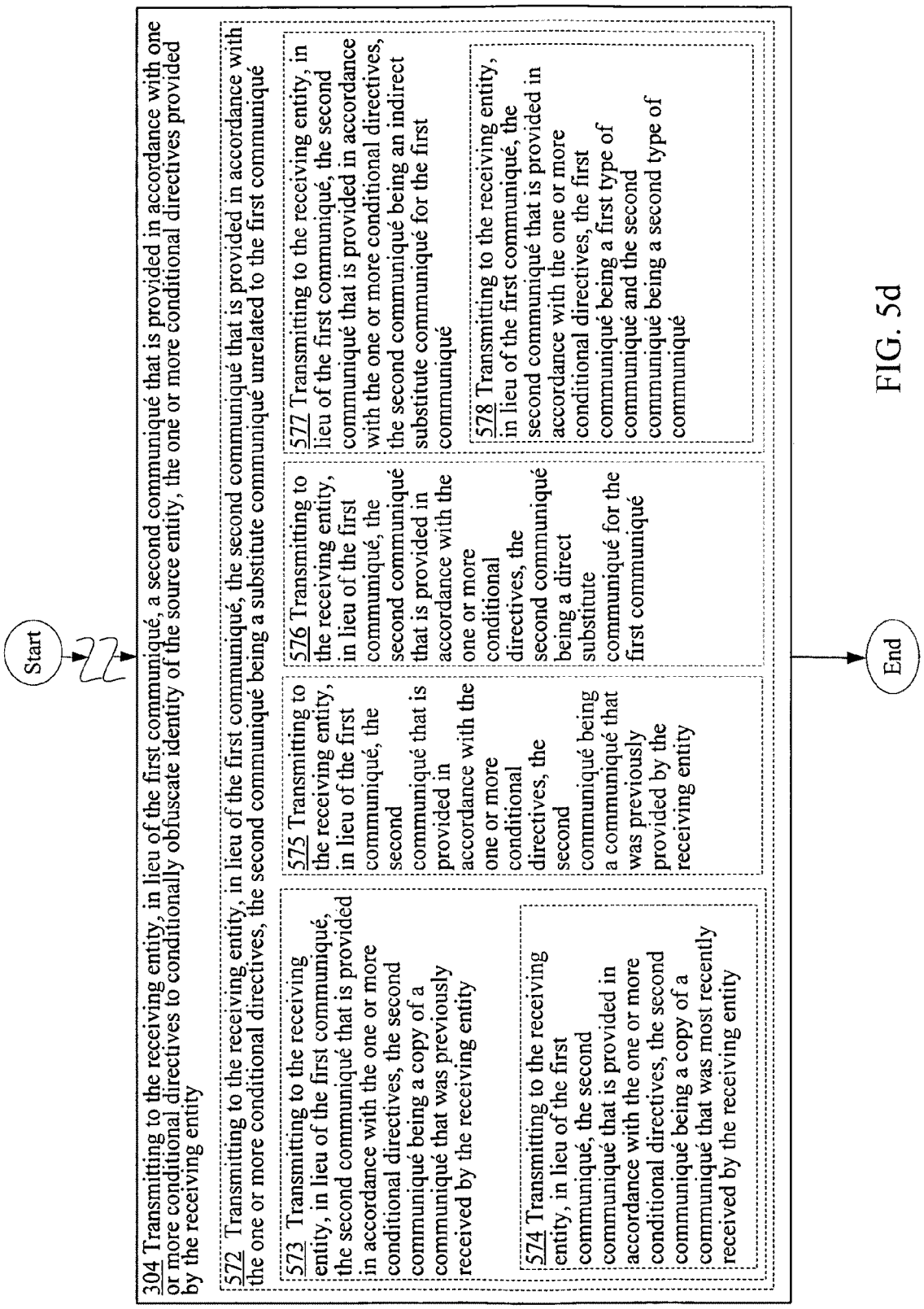
FIG. 5d is a high-level logic flowchart of a process depicting alternate implementations of the communiqué transmitting operation 304 of FIG. 3.

In some implementations, rather than transmitting a second communiqué 52 that is as a result of modifying the first communiqué 50 as was the case for the previously described operations depicted in FIGS. 5a, 5b, and 5c, the communiqué transmitting operation 304 of FIG. 3 may include operations for transmitting a second communiqué 52 that is a substitute communiqué unrelated to the first communiqué 50. For example, in some implementations, the communiqué transmitting operation 304 of FIG. 3 may include an operation 572 for transmitting to the receiving entity, in lieu of the first communiqué, the second communiqué that is provided in accordance with the one or more conditional directives, the second communiqué being a substitute communiqué unrelated to the first communiqué as depicted in FIG. 5d. For instance, the communiqué transmitting module 104 including the substitute communiqué providing module 240 (see FIG. 2b) of the network device 10 of FIG. 1b transmitting to the receiving entity 30, in lieu of the first communiqué 50, the second communiqué 52 that is provided in accordance with the one or more conditional directives 54, the second communiqué 52 being a substitute communiqué provided by the substitute communiqué providing module 240 and being unrelated to the first communiqué 50. In other words, the second communiqué 52 being a completely distinct communiqué from the first communiqué 50 and not merely a modified version of the first communiqué 50.

Operation 572 for transmitting to the receiving entity, in lieu of the first communiqué, the second communiqué that is provided in accordance with the one or more conditional directives, the second communiqué being a substitute communiqué unrelated to the first communiqué may be executed in a number of different ways in various alternative implementations. For example, in some implementations, operation 572 may include an operation 573 for transmitting to the receiving entity, in lieu of the first communiqué, the second communiqué that is provided in accordance with the one or more conditional directives, the second communiqué being a copy of a communiqué that was previously received by the receiving entity as further depicted in FIG. 5d. For instance, the communiqué transmitting module 104 including the previously received communiqué providing module 242 (see FIG. 2b) of the network device 10 transmitting to the receiving entity 30, in lieu of the first communiqué 50, the second communiqué 52 that is provided in accordance with the one or more conditional directives 54, the second communiqué 52 being a copy of a communiqué that was previously received by the receiving entity 30 and being provided by the previously received communiqué providing module 242. In some cases, the second communiqué 52 may be a copy of a communiqué that is the last or the most recently received communiqué of the receiving entity 30.

In some cases, operation 573 may further include an operation 574 for transmitting to the receiving entity, in lieu of the first communiqué, the second communiqué that is provided in accordance with the one or more conditional directives, the second communiqué being a copy of a communiqué that was most recently received by the receiving entity as further depicted in FIG. 5d. For instance, the communiqué transmitting module 104 including the previously received communiqué providing module 242 of the network device 10 transmitting to the receiving entity 30, in lieu of the first communiqué 50, the second communiqué 52 that is provided in accordance with the one or more conditional directives 54, the second communiqué 52 being a copy of a communiqué that was most recently received by the receiving entity 30 and being provided by the previously received communiqué providing module 242.

In the same or different implementations, operation 572 may include an operation 575 for transmitting to the receiving entity, in lieu of the first communiqué, the second communiqué that is provided in accordance with the one or more conditional directives, the second communiqué being a communiqué that was previously provided by the receiving entity as depicted in FIG. 5d. For instance, the communiqué transmitting module 104 including the substitute communiqué providing module 240 of the network device 10 of FIG. 1b transmitting to the receiving entity 30, in lieu of the first communiqué 50, the second communiqué 52 that is provided by the substitute communiqué providing module 240 in accordance with the one or more conditional directives 54, the second communiqué 52 being a communiqué that was previously provided by the receiving entity 30.

In the same or different implementations, operation 572 may include an operation 576 for transmitting to the receiving entity, in lieu of the first communiqué, the second communiqué that is provided in accordance with the one or more conditional directives, the second communiqué being a direct substitute communiqué for the first communiqué as further depicted in FIG. 5*d*. For instance, the communiqué transmitting module 104 including the substitute communiqué providing module 240 of the network device 10 transmitting to the receiving entity 30, in lieu of the first communiqué 50, the second communiqué 52 that is provided by the substitute communiqué providing module 240 in accordance with the one or more conditional directives 54, the second communiqué 52 being a direct substitute communiqué (e.g., an email substitute) for the first communiqué 50 (e.g., an email).

In the same or different implementations, operation 572 may include an operation 577 for transmitting to the receiving entity, in lieu of the first communiqué, the second communiqué that is provided in accordance with the one or more conditional directives, the second communiqué being an indirect substitute communiqué for the first communiqué as depicted in FIG. 5*d*. For instance, the communiqué transmitting module 104 including the substitute communiqué providing module 240 of the network device 10 transmitting to the receiving entity 30, in lieu of the first communiqué 50, the second communiqué 52 that is provided by the substitute communiqué providing module 240 in accordance with the one or more conditional directives 54, the second communiqué 52 (e.g., voice message) being an indirect substitute communiqué for the first communiqué 50 (e.g., text message).

In some implementations, operation 577 may further include an operation 578 for transmitting to the receiving entity, in lieu of the first communiqué, the second communiqué that is provided in accordance with the one or more conditional directives, the first communiqué being a first type of communiqué and the second communiqué being a second type of communiqué as illustrated in FIG. 5*d*. For instance, the communiqué transmitting module 104 of the network device 10 transmitting to the receiving entity 30, in lieu of the first communiqué 50, the second communiqué 52 that is provided in accordance with the one or more conditional directives 54, the first communiqué 50 being a first type of communiqué (e.g., a telephone call) and the second communiqué 52 being a second type of communiqué (e.g., an email). In various implementations, a direct substitute communiqué may be a substitute communiqué that is the same type of communiqué as the communiqué being replaced. For example, if the first communiqué 50 is an instant message than the second communiqué 52 will also be an instant message if the second communiqué 52 is a direct substitute communiqué.

Figure 5E:
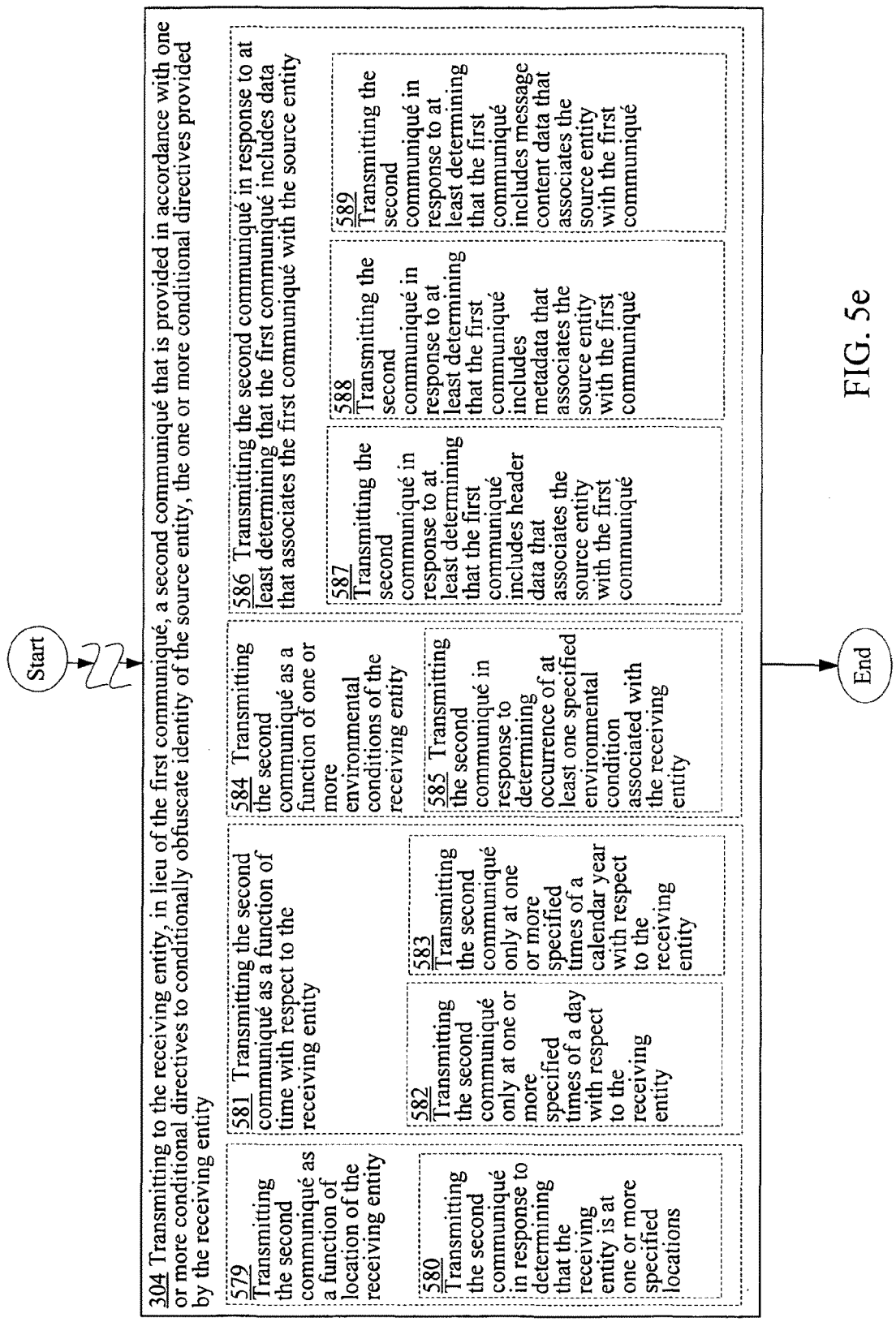
FIG. 5e is a high-level logic flowchart of a process depicting alternate implementations of the communiqué transmitting operation 304 of FIG. 3.

In various implementations, the transmission of the second communiqué 52 in the communiqué transmitting operation 304 of FIG. 3 may be in response to certain conditions arising. For example, in some cases, the communiqué transmitting operation 304 of FIG. 3 may include an operation 579 for transmitting the second communiqué as a function of location of the receiving entity as depicted in FIG. 5*e*. For instance, the communiqué transmitting module 104 of the network device 10 transmitting the second communiqué 52 as a function of location of the receiving entity 30. For example, if the receiving entity 30 includes a human user, such as a human receiving user 32, then the second communiqué 52 may be transmitted only when the receiving entity 30 is or is not at one or more selective locations. For instance, and as a further illustration, the second communiqué 52 being transmitted only when the receiving entity 30 (e.g., human receiving user 32) is at home.

In some cases, operation 579 may further include an operation 580 for transmitting the second communiqué in response to determining that the receiving entity is at one or more specified locations as further depicted in FIG. 5*e*. For instance, the communiqué transmitting module 104 including the receiving entity location determining module 244 (see FIG. 2*b*) of the network device 10 of FIG. 1*b* transmitting the second communiqué 52 in response to the receiving entity location determining module 244 determining that the receiving entity 30 is at one or more specified locations. For example, if the receiving entity location determining module 244 determines that the receiving entity 30 is either at school or at work, then transmitting the second communiqué 52.

In the same or different implementations, the communiqué transmitting operation 304 of FIG. 3 may include an operation 581 for transmitting the second communiqué as a function of time with respect to the receiving entity as depicted in FIG. 5*e*. For instance, the communiqué transmitting module 104 of the network device 10 transmitting the second communiqué 52 as a function of time with respect to the receiving entity 30. For example, transmitting the second communiqué 52 only when the local time for the receiving entity 30 is between noon and 3 PM.

In some cases, operation 581 may include an operation 582 for transmitting the second communiqué only at one or more specified times of a day with respect to the receiving entity as further depicted in FIG. 5*e*. For instance, the communiqué transmitting module 104 including a receiving entity time determining module 246 of the network device 10 transmitting the second communiqué 52 only at one or more specified times of a day with respect to the receiving entity 30 as determined by the receiving entity time determining module 246 based on, for example, the receiving entity data 55 provided by the receiving entity 30.

In the same or different implementations, operation 581 may include an operation 583 for transmitting the second communiqué only at one or more specified times of a calendar year with respect to the receiving entity as further depicted in FIG. 5*e*. For instance, the communiqué transmitting module 104 including the receiving entity time determining module 246 of the network device 10 transmitting the second communiqué 52 only at one or more specified times of a calendar year with respect to the receiving entity 30 as determined by the receiving entity time determining module 246.

In some implementations, the communiqué transmitting operation 304 of FIG. 3 may include an operation 584 for transmitting the second communiqué as a function of one or more environmental conditions of the receiving entity as depicted in FIG. 5*e*. For instance, the communiqué transmitting module 104 of the network device 10 transmitting the second communiqué 52 as a function of one or more environmental conditions (e.g., as determined by the receiving entity environmental condition determining module 248 based on, for example, the receiving entity data 55 provided by the receiving entity 30) of the receiving entity 30.

In some cases, operation 584 may further include an operation 585 for transmitting the second communiqué in response to determining occurrence of at least one specified environmental condition associated with the receiving entity as depicted in FIG. 5*e*. For instance, the communiqué transmitting module 104 including the receiving entity environmental condition determining module 248 of the network device 10 transmitting the second communiqué 52 in response to the receiving entity environmental condition determining module 248 determining occurrence of at least one specified environmental condition (e.g., presence or absence of a particular party in the vicinity of the receiving entity 30) associated with the receiving entity 30.

In various implementations, the communiqué transmitting operation 304 of FIG. 3 may include an operation 586 for transmitting the second communiqué in response to at least determining that the first communiqué includes data that associates the first communiqué with the source entity as depicted in FIG. 5e. For instance, the communiqué transmitting module 104 including the source entity association determining module 250 (see FIG. 2b) of the network device 10 transmitting the second communiqué 52 in response to the source entity association determining module 250 at least determining that the first communiqué 50 includes data that associates the first communiqué 50 with the source entity 20.

As further depicted in FIG. 5e, operation 586 may include one or more additional operations in various alternative implementations. For example, in some cases, operation 586 may include an operation 587 for transmitting the second communiqué in response to at least determining that the first communiqué includes header data that associates the source entity with the first communiqué as depicted in FIG. 5e. For instance, the communiqué transmitting module 104 including the source entity association determining module 250 of the network device 10 transmitting the second communiqué 52 in response to the source entity association determining module 250 at least determining that the first communiqué 50 includes header data that associates the source entity 20 with the first communiqué 50. As a further illustration, for example, the communiqué transmitting module 104 transmitting the second communiqué 52 in response to the source entity association determining module 250 at least determining that the first communiqué 50 include header data that indicates that the source entity 20 is the sender of the first communiqué 50.

In the same or different implementations, operation 586 may include an operation 588 for transmitting the second communiqué in response to at least determining that the first communiqué includes metadata that associates the source entity with the first communiqué as depicted in FIG. 5e. For instance, the communiqué transmitting module 104 including the source entity association determining module 250 of the network device 10 transmitting the second communiqué 52 in response to the source entity association determining module 250 at least determining that the first communiqué 50 includes metadata that associates the source entity 20 with the first communiqué 50. As a further illustration, for example, the communiqué transmitting module 104 transmitting the second communiqué 52 in response to the source entity association determining module 250 at least determining that the first communiqué 50 include metadata that indicates that the source entity 20 is the source for the first communiqué 50.

In the same or different implementations, operation 586 may include an operation 589 for transmitting the second communiqué in response to at least determining that the first communiqué includes message content data that associates the source entity with the first communiqué as depicted in FIG. 5e. For instance, the communiqué transmitting module 104 including the source entity association determining module 250 of the network device 10 transmitting the second communiqué 52 in response to the source entity association determining module 250 at least determining that the first communiqué 50 includes message content data that associates the source entity 20 with the first communiqué 50. As a further illustration, for example, the communiqué transmitting module 104 transmitting the second communiqué 52 in response to the source entity association determining module 250 at least determining that the first communiqué 50 include message content data such as textual or voice data that indicates that the source entity 20 is the author or original source for the'first communiqué 50.

Figure 5F:
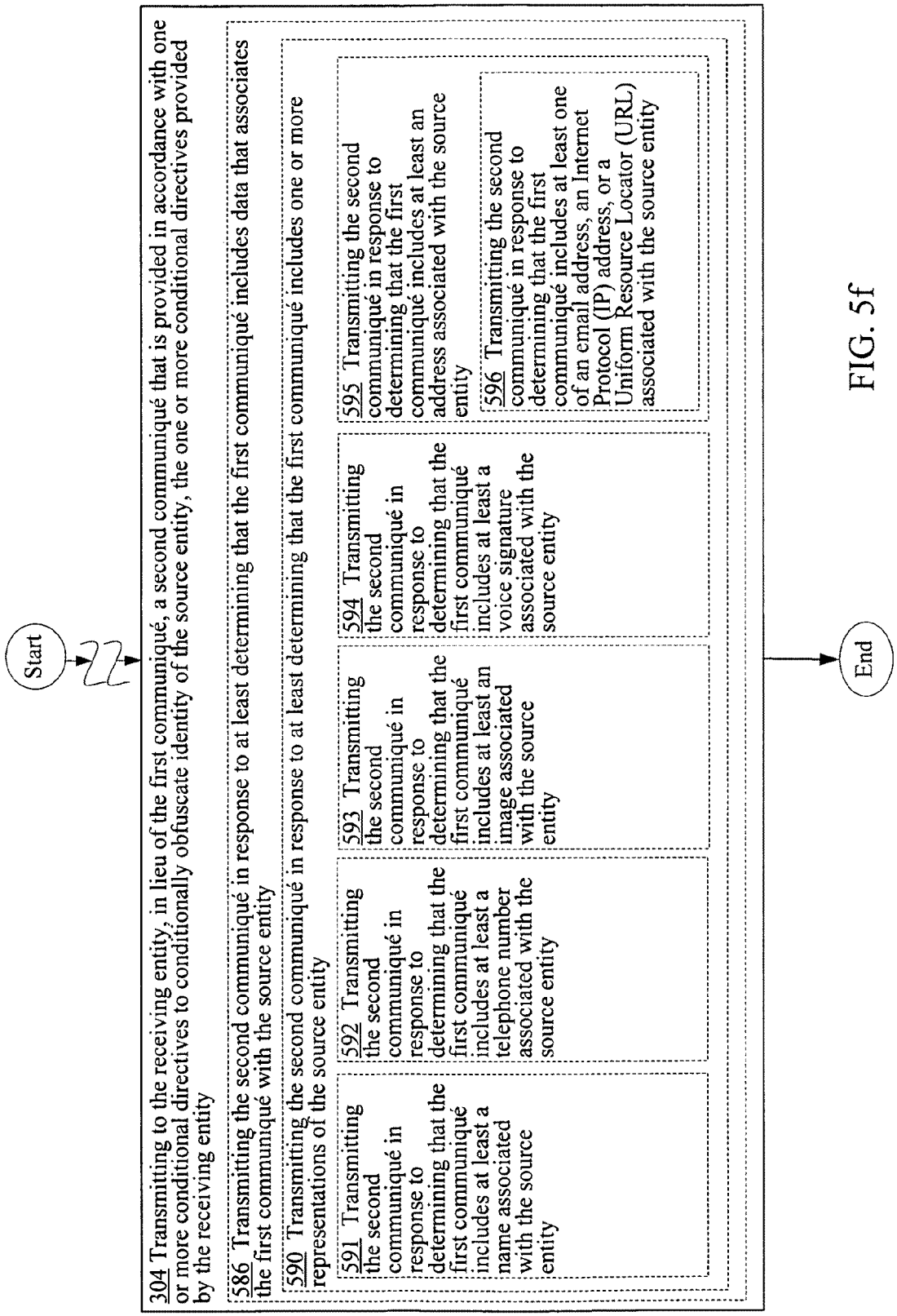
FIG. 5f is a high-level logic flowchart of a process depicting alternate implementations of the communiqué transmitting operation 304 of FIG. 3.

In the same or different implementations, the operation 586 for transmitting the second communiqué in response to at least determining that the first communiqué includes data that associates the first communiqué with the source entity may include an operation 590 for transmitting the second communiqué in response to at least determining that the first communiqué includes one or more representations of the source entity as illustrated in FIG. 5f. For instance, the communiqué transmitting module 104 including the source entity representation determining module 252 (see FIG. 2b) of the network device 10 transmitting the second communiqué 52 in response to the source entity representation determining module 252 at least determining that the first communiqué 50 includes one or more representations (e.g., one or more of names, addresses, telephone numbers, images, voice signature, and/or other identifiers) of the source entity 20.

As further depicted in FIG. 5f, operation 590 may include one or more additional operations in various alternative implementations. For example, in some implementations, operation 590 may include an operation 591 for transmitting the second communiqué in response to determining that the first communiqué includes at least a name associated with the source entity as further depicted in FIG. 5f. For instance, the communiqué transmitting module 104 including the source entity name determining module 254 (see FIG. 2b) of the network device 10 transmitting the second communiqué 52 in response to including the source entity name determining module 254 determining that the first communiqué 50 includes at least a name associated with the source entity 20.

In the same or different implementations, operation 590 may include an operation 592 for transmitting the second communiqué in response to determining that the first communiqué includes at least a telephone number associated with the source entity as further depicted in FIG. 5f. For instance, the communiqué transmitting module 104 including the source entity telephone number determining module 256 (see FIG. 2b) of the network device 10 transmitting the second communiqué 52 in response to the source entity telephone number determining module 256 determining that the first communiqué 50 includes at least a telephone number associated with the source entity 20.

In the same or different implementations, operation 590 may include an operation 593 for transmitting the second communiqué in response to determining that the first communiqué includes at least an image associated with the source entity as further depicted in FIG. 5f. For instance, the communiqué transmitting module 104 including the source entity associated image determining module 258 (see FIG. 2b) of the network device 10 transmitting the second communiqué 52 in response to the source entity associated image determining module 258 determining that the first communiqué 50 includes at least an image (e.g., iconic figure or a facial image) associated with the source entity 20.

In the same or different implementations, operation 590 may include an operation 594 for transmitting the second communiqué in response to determining that the first communiqué includes at least a voice signature associated with the source entity as further depicted in FIG. 5f. For instance, the communiqué transmitting module 104 including the source entity associated voice signature determining module 260 (see FIG. 2b) of the network device 10 transmitting the second communiqué 52 in response to the source entity associated voice signature determining module 260 determining that the first communiqué 50 includes at least a voice signature associated with the source entity 20. In other words, the communiqué transmitting module 104 transmitting the second communiqué 52 in response to the source entity associated voice signature determining module 260 determining that the first communiqué 50 includes voice data that matches with a voice signature associated with the source entity 20 (e.g., human source user 22).

In the same or different implementations, operation 590 may include an operation 595 for transmitting the second communiqué in response to determining that the first communiqué includes at least an address associated with the source entity as further depicted in FIG. 5f. For instance, the communiqué transmitting module 104 including the source entity associated address determining module 262 (see FIG. 2b) of the network device 10 transmitting the second communiqué 52 in response to the source entity associated address determining module 262 determining that the first communiqué 50 includes at least an address (e.g., email address, an IP address, URL, and so forth) associated with the source entity 20.

In some cases, operation 595 may further include an operation 596 for transmitting the second communiqué in response to determining that the first communiqué includes at least one of an email address, an Internet Protocol (IP) address, or a Uniform Resource Locator (URL) associated with the source entity as further depicted in FIG. 5f. For instance, the communiqué transmitting module 104 including the source entity associated address determining module 262 of the network device 10 transmitting the second communiqué 52 in response to the source entity associated address determining module 262 determining that the first communiqué 50 includes data that indicates at least one of an email address, an Internet Protocol (IP) address, or a Uniform Resource Locator (URL) associated with the source entity 20.

Figure 5G:
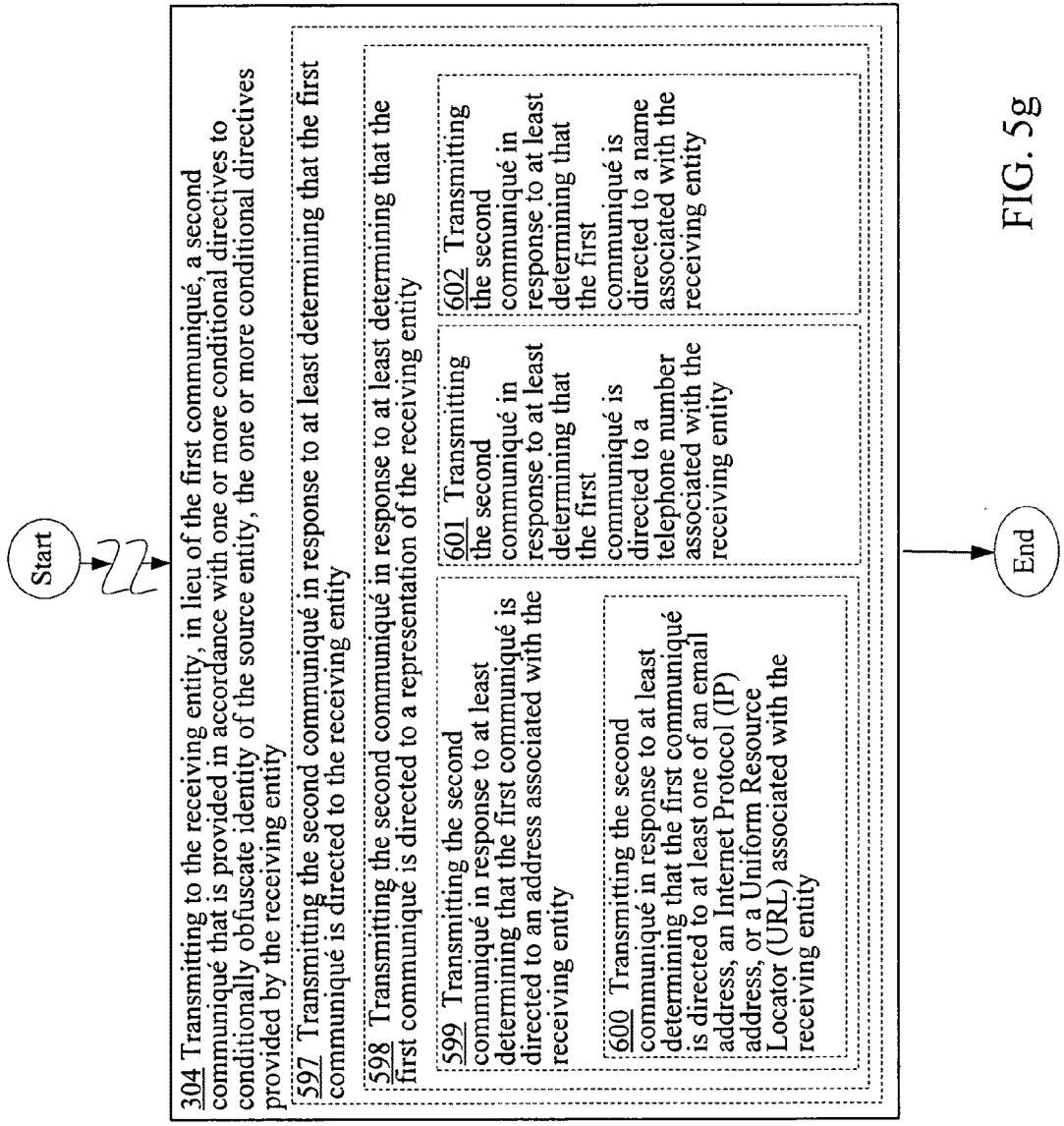
FIG. 5g is a high-level logic flowchart of a process depicting alternate implementations of the communiqué transmitting operation 304 of FIG. 3.

In some cases, the second communiqué 52 that is transmitted through the communiqué transmitting operation 304 of FIG. 3 may be transmitted in response to a determination that the first communiqué 50 is at least directed to the receiving entity 30. For example, in some implementations, the communiqué transmitting operation 304 may include an operation 597 for transmitting the second communiqué in response to at least determining that the first communiqué is directed to the receiving entity as depicted in FIG. 5g. For instance, the communiqué transmitting module 104 including the receiving entity directed determining module 264 (see FIG. 2b) of the network device 10 transmitting the second communiqué 52 in response to the receiving entity directed determining module 264 at least determining that the first communiqué 50 is directed to the receiving entity 30.

As further depicted in FIG. 5g, operation 597 may further include one or more additional operations in various alternative implementations. For example, in some cases, operation 597 may include an operation 598 for transmitting the second communiqué in response to at least determining that the first communiqué is directed to a representation of the receiving entity as further depicted in FIG. 5g. For instance, the communiqué transmitting module 104 including the receiving entity representation directed determining module 266 (see FIG. 2b) of the network device 10 transmitting the second communiqué 52 in response to the receiving entity representation directed determining module 266 at least determining that the first communiqué 50 is directed to a representation (e.g., address or telephone number) of the receiving entity 30.

In various implementations, operation 598 may further include an operation 599 for transmitting the second communiqué in response to at least determining that the first communiqué is directed to an address associated with the receiving entity as further depicted in FIG. 5g. For instance, the communiqué transmitting module 104 including the receiving entity address directed determining module 268 (see FIG. 2b) of the network device 10 transmitting the second communiqué 52 in response to the receiving entity address directed determining module 268 at least determining that the first communiqué 50 is directed to (e.g., sent to) an address associated with the receiving entity 30.

In some implementations, operation 599 may further include an operation 600 for transmitting the second communiqué in response to at least determining that the first communiqué is directed to at least one of an email address, an Internet Protocol (IP) address, or a Uniform Resource Locator (URL) associated with the receiving entity as further depicted in FIG. 5g. For instance, the communiqué transmitting module 104 including the receiving entity address directed determining module 268 of the network device 10 transmitting the second communiqué 52 in response to the receiving entity address directed determining module 268 at least determining that the first communiqué 50 is directed to at least one of an email address, an Internet Protocol (IP) address, or a Uniform Resource Locator (URL) associated with the receiving entity 30.

In the same or different implementations, operation 598 may include an operation 601 for transmitting the second communiqué in response to at least determining that the first communiqué is directed to a telephone number associated with the receiving entity as further depicted in FIG. 5g. For instance, the communiqué transmitting module 104 including the receiving entity telephone number directed determining module 270 of the network device 10 transmitting the second communiqué 52 in response to the receiving entity telephone number directed determining module 270 at least determining that the first communiqué 50 is directed to a telephone number associated with the receiving entity 30.

In the same or different implementations, operation 598 may include an operation 602 for transmitting the second communiqué in response to at least determining that the first communiqué is directed to a name associated with the receiving entity as further depicted in FIG. 5g. For instance, the communiqué transmitting module 104 including the receiving entity name directed determining module 272 of the network device 10 transmitting the second communiqué 52 in response to the receiving entity name directed determining module 272 at least determining that the first communiqué 50 is directed to a name associated with the receiving entity 30.

Figure 5H:
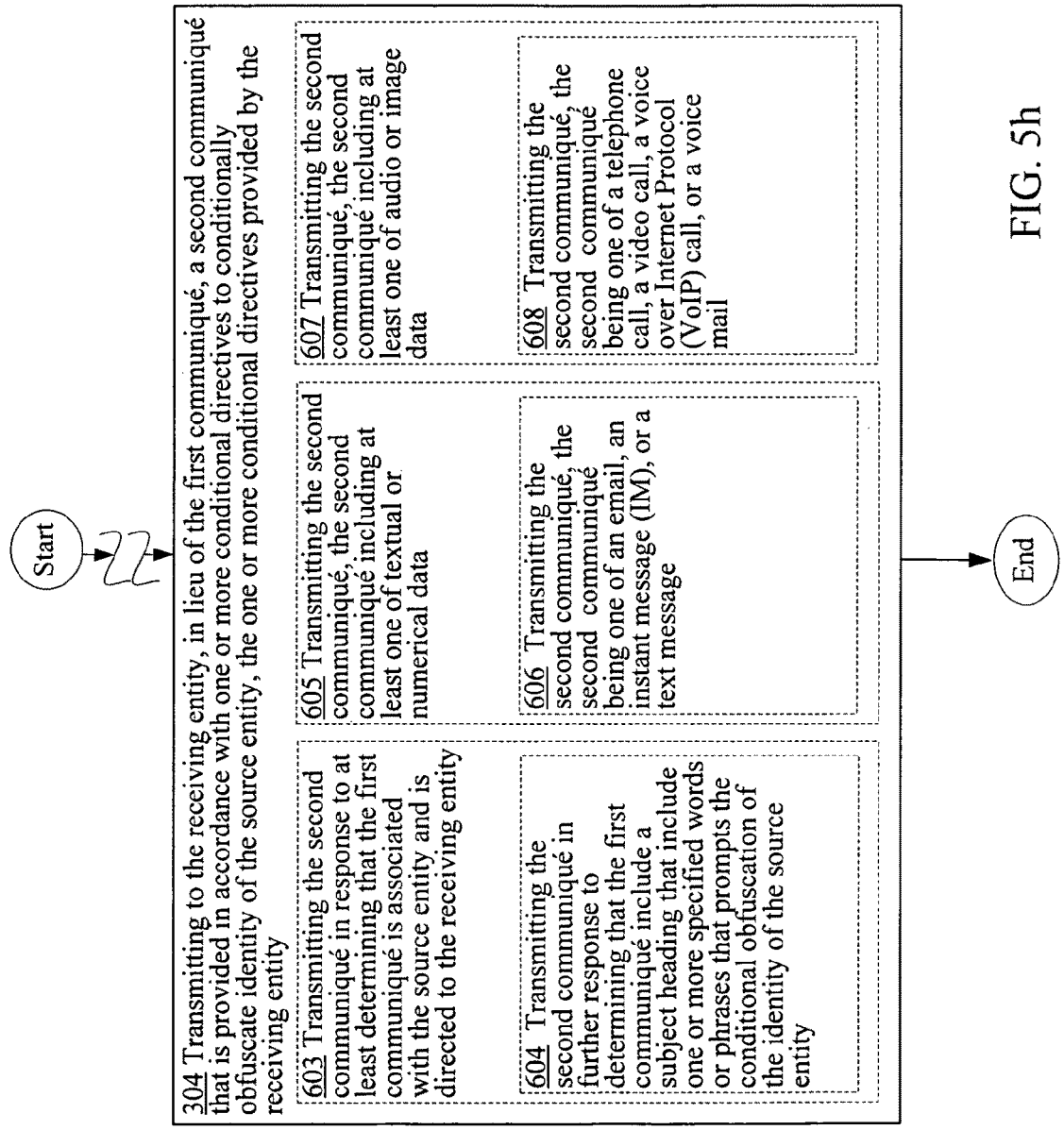
FIG. 5h is a high-level logic flowchart of a process depicting alternate implementations of the communiqué transmitting operation 304 of FIG. 3.

In various implementations, the communiqué transmitting operation 304 of FIG. 3 may include an operation 603 for transmitting the second communiqué in response to at least determining that the first communiqué is associated with the source entity and is directed to the receiving entity as depicted in FIG. 5h. For instance, the communiqué transmitting module 104 including the source entity association determining module 250 and the receiving entity directed determining module 264 of the network device 10 of FIG. 1b transmitting the second communiqué 52 in response to the source entity association determining module 250 and the receiving entity directed determining module 264 respectively determining that the first communiqué 50 is associated with the source entity 20 and is directed to the receiving entity 30.

In some cases, operation 603 may further include an operation 604 for transmitting the second communiqué in further response to determining that the first communiqué include a subject heading that include one or more specified words or phrases that prompts the conditional obfuscation of the identity of the source entity as depicted in FIG. 5h. For instance, the communiqué transmitting module 104 including the subject heading determining module 274 (see FIG. 2b) of the network device 10 transmitting the second communiqué 52 in further response to the subject heading determining module 274 determining that the first communiqué 50 include a subject heading that include one or more specified words or phrases that prompts the conditional obfuscation of the identity of the source entity 20.

In some implementations, the communiqué transmitting operation 304 of FIG. 3 may include an operation 605 for transmitting the second communiqué, the second communiqué including at least one of textual or numerical data as depicted in FIG. 5h. For instance, the communiqué transmitting module 104 of the network device 10 transmitting the second communiqué 52, the second communiqué 52 including at least one of textual or numerical data.

In some cases, operation 605 may further include an operation 606 for transmitting the second communiqué, the second communiqué being one of an email, an instant message (IM), or a text message as further depicted in FIG. 5h. For instance, the communiqué transmitting module 104 of the network device 10 transmitting the second communiqué 52, the second communiqué 52 being one of an email, an instant message (IM), or a text message.

In some implementations, the communiqué transmitting operation 304 of FIG. 3 may include an operation 607 for transmitting the second communiqué, the second communiqué including at least one of audio or image data as depicted in FIG. 5h. For instance, the communiqué transmitting module 104 of the network device 10 transmitting the second communiqué 52, the second communiqué 52 including at least one of audio or image data (e.g., voice data and/or video or digital image data).

In some cases, operation 607 may further include an operation 608 for transmitting the second communiqué, the second communiqué being one of a telephone call, a video call, a voice over Internet Protocol (VoIP) call, or a voice mail as further depicted in FIG. 5h. For instance, the communiqué transmitting module 104 of the network device 10 transmitting the second communiqué 52, the second communiqué 52 being one of a telephone call, a video call, a voice over Internet Protocol (VoIP) call, or a voice mail.

Figure 5I:
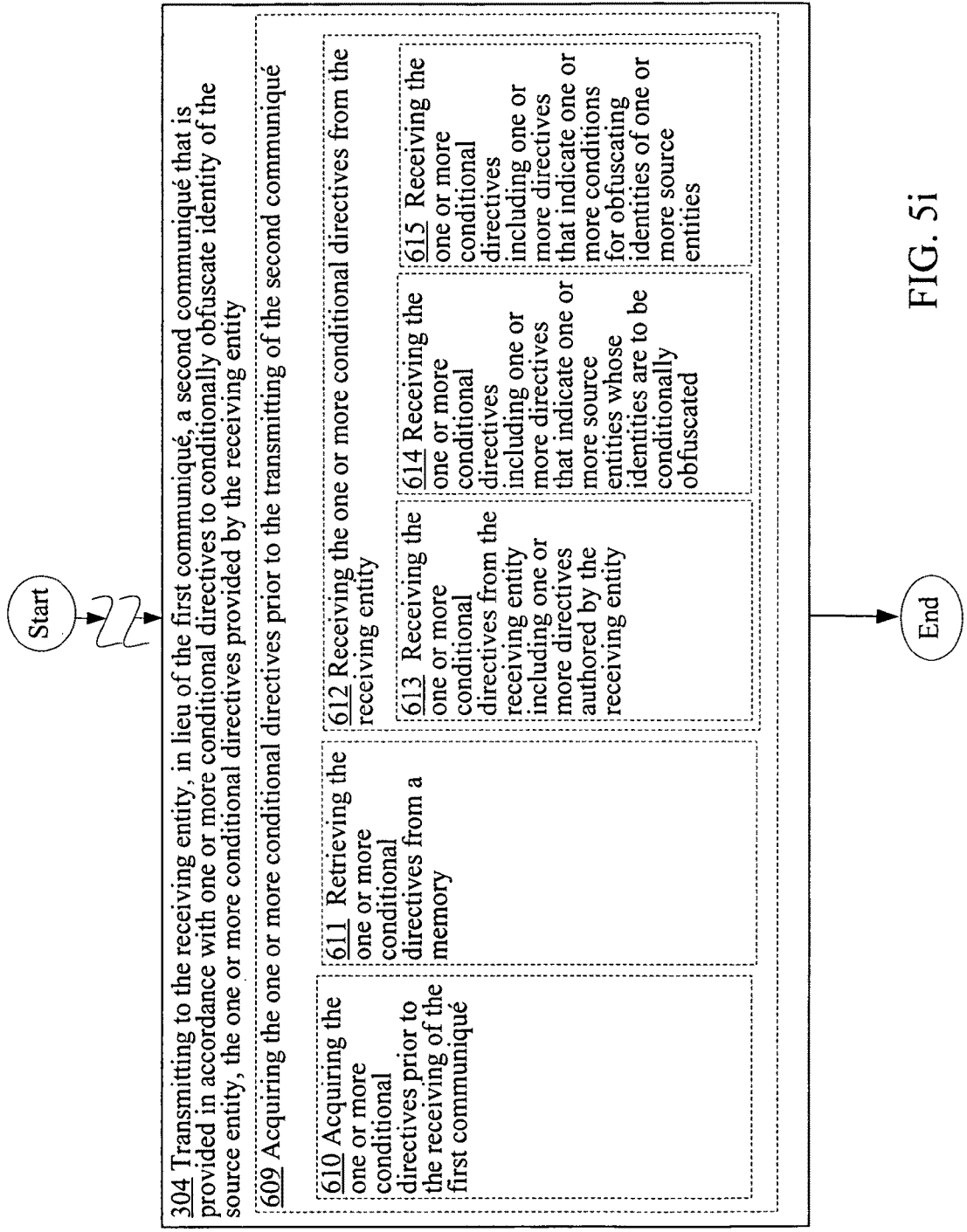
FIG. 5I is a high-level logic flowchart of a process depicting alternate implementations of the communiqué transmitting operation 304 of FIG. 3.

In some implementations, the communiqué transmitting operation 304 of FIG. 3 may include an operation 609 for acquiring the one or more conditional directives prior to the transmitting of the second communiqué as illustrated in FIG. 5i. For instance, the conditional directive acquisition module 276 (see FIG. 2b) of the network device 10 of FIG. 1b acquiring (e.g., retrieving or receiving) the one or more conditional directives 54 prior to the transmitting of the second communiqué 52.

As further illustrated in FIG. 5i, operation 609 may further include one or more additional operations in various alternative implementations. For example, in some implementations, operation 609 may include an operation 610 for acquiring the one or more conditional directives prior to the receiving of the first communiqué as depicted in FIG. 5i. For instance, the conditional directive acquisition module 276 of the network device 10 acquiring the one or more conditional directives 54 prior to the receiving of the first communiqué 50.

The one or more conditional directives 54 acquired through operation 609 may be acquired from a variety of sources. For example, in some implementations, operation 609 may include an operation 611 for retrieving the one or more conditional directives from a memory as depicted in FIG. 5i. For instance, the conditional directive retrieving module 278 (see FIG. 2b) of the network device 10 retrieving the one or more conditional directives 54 from a memory 140.

In some implementations, operation 609 may include an operation 612 for receiving the one or more conditional directives from the receiving entity as depicted in FIG. 5i. For instance, the conditional directive receiving module 280 (see FIG. 2b) of the network device 10 receiving the one or more conditional directives 54 (e.g., via one or more communication networks 40) from the receiving entity 30. As further depicted in FIG. 5i, operation 612 may further include one or more additional operations.

For example, in some cases, operation 612 may include an operation 613 for receiving the one or more conditional directives from the receiving entity including one or more directives authored by the receiving entity as further depicted in FIG. 5i. For instance, the conditional directive receiving module 280 of the network device 10 receiving the one or more conditional directives 54 from the receiving entity 30 including one or more directives authored (e.g., created) by the receiving entity 30.

In some cases, operation 612 may include an operation 614 for receiving the one or more conditional directives including one or more directives that indicate one or more source entities whose identities are to be conditionally obfuscated as further depicted in FIG. 5i. For instance, the conditional directive receiving module 280 of the network device 10 receiving the one or more conditional directives 54 including one or more directives that indicate one or more source entities 20 whose identities are to be conditionally obfuscated.

In some cases, operation 612 may include an operation 615 for receiving the one or more conditional directives including one or more directives that indicate one or more conditions for obfuscating identities of one or more source entities as further depicted in FIG. 5i. For instance, the conditional directive receiving module 280 of the network device 10 receiving the one or more conditional directives 54 including one or more directives that indicate one or more conditions (e.g., location or time associated with the receiving entity 30, reception of a first communiqué 50 that is determined to be affiliated with a particular source entity 20, and so forth) for obfuscating identities of one or more source entities 20.

Figure 6:
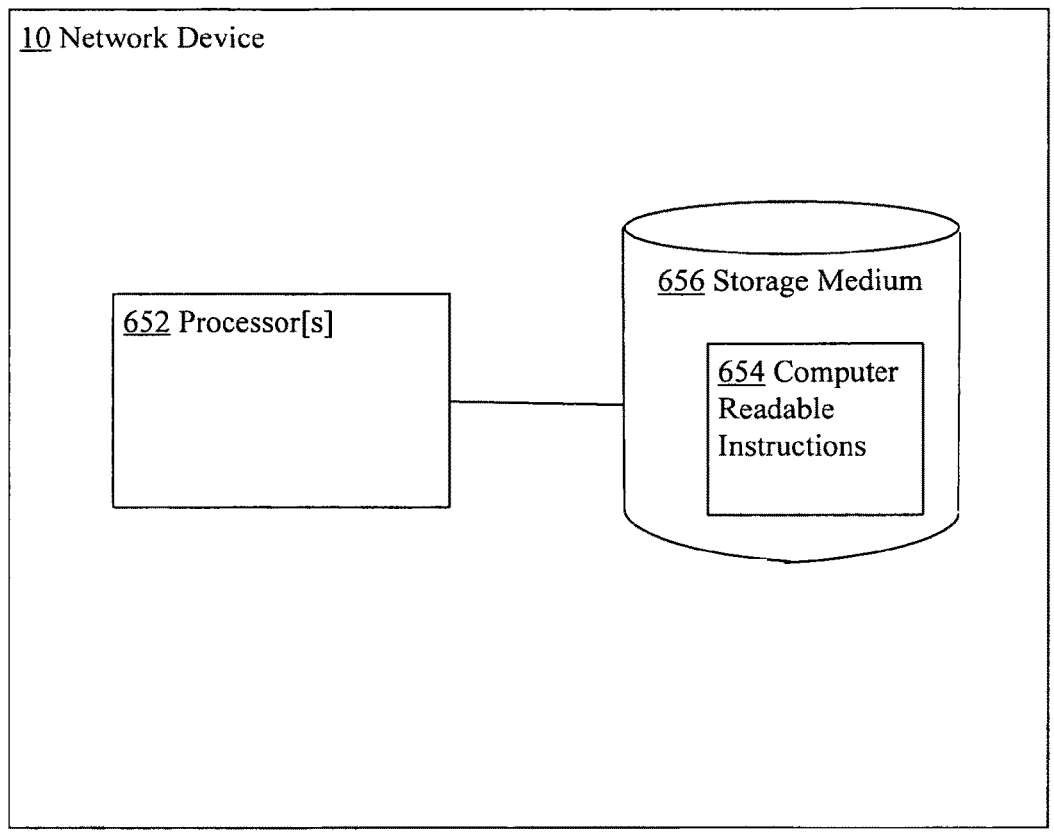
FIG. 6 is another high-level block diagram showing one implementation of the network device 10 of FIG. 1b.

Turning now to FIG. 6, which is a high-level block diagram illustrating a particular implementation of the network device 10 of FIG. 1b. As illustrated, the network device 10, which in some cases may comprise of one or more servers, may include one or more processors 652 (e.g., one or more microprocessors, one or more controllers, and so forth) linked to storage medium 656 (e.g., volatile and/or non-volatile memory). The storage medium 656 may store computer readable instructions 654 (e.g., computer program product). The one or more processors 652, in various implementations, may execute the computer readable instructions 654 in order to execute one or more operations described above and as illustrated in, for example, FIGS. 3, 4a, 4b, 4c, 4d, 4e, 4f, 5a, 5b, 5c, 5d, 5e, 5f, 5g, 5h, and 5i. From another perspective, FIG. 6 illustrates one implementation of the network device 10 in which the communiqué receiving module 102, the communiqué transmitting module 104, and their sub-modules (e.g., as illustrated in FIGS. 2a and 2b) of the network device 10 are implemented by the one or more processors 652 executing software (e.g., depicted as computer readable instructions 654 in FIG. 6) that may be stored in a memory (e.g., depicted as storage medium 656 in FIG. 6).

For example, the processor 652 may execute the computer readable instructions 654 in order to receive a first communiqué 50 that is affiliated with a source entity 20 and that is directed to a receiving entity 30; and to transmit to the receiving entity 30, in lieu of the first communiqué 50, a second communiqué 52 that is provided in accordance with one or more conditional directives 54 to conditionally obfuscate identity of the source entity 20, the one or more conditional directives 54 provided by the receiving entity 30 as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method, comprising:
   receiving a first communiqué that is affiliated with a source entity and that is directed to a receiving entity; and
   transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, and wherein the transmitting to the receiving entity includes at least:
   transmitting to the receiving entity, in lieu of the first communiqué, the second communiqué that is provided based, at least in part, on the received first communiqué and in accordance with the one or more conditional directives, the second communiqué being provided by modifying the first communiqué in accordance with the one or more conditional directives, wherein the modifying the first communiqué in accordance with the one or more conditional directives includes at least:
   modifying the first communiqué in accordance with the one or more conditional directives by replacing one or more representations of the source entity included in the first communiqué with one or more locum tenentes, the replacing of the one or more representations of the source entity including at least replacing, with one or more substitutes, at least one of one or more names associated with the source entity, one or more telephone numbers associated with the source entity or one or more email addresses associated with the source entity.

2. The method of claim 1, wherein said receiving a first communiqué that is affiliated with a source entity and that is directed to a receiving entity, comprises:
   receiving the first communiqué at one or more network nodes.

3. The method of claim 2, wherein said receiving the first communiqué at one or more network nodes, comprises:
   receiving the first communiqué at the one or more network nodes including receiving the first communiqué at one or more network servers.

4. The method of claim 2, wherein said receiving the first communiqué at one or more network nodes, comprises:
   receiving the first communiqué at the one or more network nodes including receiving the first communiqué at at least one of a telephone switch or a telephone exchange.

5. The method of claim 2, wherein said receiving the first communiqué at one or more network nodes, comprises:

receiving the first communiqué at the one or more network nodes including receiving the first communiqué at least at one router.

6. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
  transmitting the second communiqué via one or more communication networks.

7. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes, the one or more representations to be replaced being one or more representations in header data form.

8. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes, the one or more representations to be replaced being one or more representations in message content data form.

9. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes, the one or more representations to be replaced being one or more representations in metadata form.

10. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing one or more names associated with the source entity that are included in the first communiqué with one or more substitutes.

11. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing one or more telephone numbers associated with the source entity that are included in the first communiqué with one or more substitutes.

12. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing one or more addresses associated with the source entity that are included in the first communiqué with one or more substitutes.

13. The method of claim 12, wherein said means for replacing the one or more representations of the source entity included in the first communiqué with the one or more locum tenentes by replacing one or more addresses associated with the source entity that are included in the first communiqué with one or more substitutes, comprises:
  replacing the one or more representations of the source entity included in the first communiqué with the one or more locum tenentes by replacing one or more of an email address, an Internet Protocol (IP) address, or a Uniform Resource Locator (URL) associated with the source entity that are included in the first communiqué with one or more substitutes.

14. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing one or more images associated with the source entity that are included in the first communiqué with one or more substitutes.

15. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing one or more voice signatures associated with the source entity that are included in the first communiqué with one or more substitutes.

16. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing the one or more representations with modified versions of the one or more representations.

17. The method of claim 1, wherein said modifying the first communiqué in accordance with the one or more conditional directives by replacing one or more representations of the source entity included in the first communiqué with one or more locum tenentes, comprises:
  replacing the one or more representations of the source entity included in the first communiqué with the one or more locum tenentes by replacing the one or more representations with one or more direct substitutes.

18. The method of claim 1, wherein said modifying the first communiqué in accordance with the one or more conditional directives by replacing one or more representations of the source entity included in the first communiqué with one or more locum tenentes, comprises:
    replacing the one or more representations of the source entity included in the first communiqué with the one or more locum tenentes by replacing the one or more representations with one or more indirect substitutes.

19. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
    transmitting the second communiqué, in part, as a function of location of the receiving entity.

20. The method of claim 19, wherein said transmitting the second communiqué, in part, as a function of location of the receiving entity, comprises:
    transmitting the second communiqué partly in response to determining that the receiving entity is at one or more specified locations.

21. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
    transmitting the second communiqué, in part, as a function of time with respect to the receiving entity.

22. The method of claim 21, wherein said transmitting the second communiqué, in part, as a function of time with respect to the receiving entity, comprises:
    transmitting the second communiqué only at one or more specified times of a day with respect to the receiving entity.

23. The method of claim 21, wherein said transmitting the second communiqué, in part, as a function of time with respect to the receiving entity, comprises:
    transmitting the second communiqué only at one or more specified times of a calendar year with respect to the receiving entity.

24. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
    transmitting the second communiqué as a function of one or more environmental conditions of the receiving entity, the one or more environmental conditions including at least the presence of the particular third party in the vicinity of the receiving entity.

25. The method of claim 24, wherein said transmitting the second communiqué as a function of one or more environmental conditions of the receiving entity, the one or more environmental conditions including at least the presence of a particular third party in the vicinity of the receiving entity, comprises:
    transmitting the second communiqué in response to determining occurrence of at least one specified environmental condition associated with the receiving entity.

26. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
    transmitting the second communiqué in response to at least determining that the first communiqué includes data that associates the first communiqué with the source entity.

27. The method of claim 26, wherein said transmitting the second communiqué in response to at least determining that the first communiqué includes data that associates the first communiqué with the source entity, comprises:
    transmitting the second communiqué in response to at least determining that the first communiqué includes metadata that associates the source entity with the first communiqué.

28. The method of claim 26, wherein said transmitting the second communiqué in response to at least determining that the first communiqué includes data that associates the first communiqué with the source entity, comprises:
    transmitting the second communiqué in response to at least determining that the first communiqué includes message content data that associates the source entity with the first communiqué .

29. The method of claim 26, wherein said transmitting the second communiqué in response to at least determining that the first communiqué includes data that associates the first communiqué with the source entity, comprises:
    transmitting the second communiqué in response to at least determining that the first communiqué includes one or more representations of the source entity.

30. The method of claim 29, wherein said transmitting the second communiqué in response to at least determining that the first communiqué includes one or more representations of the source entity, comprises:
    transmitting the second communiqué in response to determining that the first communiqué includes at least a telephone number associated with the source entity.

31. The method of claim 29, wherein said transmitting the second communiqué in response to at least determining that the first communiqué includes one or more representations of the source entity, comprises:

transmitting the second communiqué in response to determining that the first communiqué includes at least an image associated with the source entity.

32. The method of claim 29, wherein said transmitting the second communiqué in response to at least determining that the first communiqué includes one or more representations of the source entity, comprises:
  transmitting the second communiqué in response to determining that the first communiqué includes at least a voice signature associated with the source entity.

33. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
  acquiring the one or more conditional directives prior to the transmitting of the second communiqué.

34. The method of claim 33, wherein said acquiring the one or more conditional directives prior to the transmitting of the second communiqué, comprises:
  receiving the one or more conditional directives from the receiving entity.

35. The method of claim 34, wherein said receiving the one or more conditional directives from the receiving entity, comprises:
  receiving the one or more conditional directives from the receiving entity including one or more directives authored by the receiving entity.

36. The method of claim 34, wherein said receiving the one or more conditional directives from the receiving entity, comprises:
  receiving the one or more conditional directives including one or more directives that indicate one or more source entities whose identities are to be conditionally obfuscated.

37. The method of claim 1, wherein said receiving a first communiqué that is affiliated with a source entity and that is directed to a receiving entity comprises:
  receiving, at one or more intermediate nodes, a first communiqué that is affiliated with a source entity and that is directed to a receiving entity, the receiving including at least intercepting the first communiqué based at least in part on a determination that the first communiqué is directed to the receiving entity, wherein intercepting includes at least one of seizing, capturing, or interrupting.

38. The method of claim 1, wherein said transmitting to the receiving entity, using one or more processors, and in lieu of the first communiqué, a second communiqué that is provided in accordance with one or more conditional directives to conditionally obfuscate identity of the source entity, the one or more conditional directives provided by the receiving entity, the one or more conditional directives including one or more instructions to transmit the second communiqué in lieu of the first communiqué based at least in part on a determination of a presence of a particular third party in vicinity of the receiving entity, the determination being based, at least in part, on receiving entity data provided by the receiving entity via at least one of microblogging or tweeting, comprises:
  transmitting to the receiving entity, in lieu of the first communiqué, a second communiqué that is provided in accordance with one or more conditional directives to conditionally obfuscate identity of the source entity, the one or more conditional directives provided by the receiving entity, the transmitting including at least transmitting the second communiqué in lieu of the first communiqué based at least in part on a determination that the first communiqué includes data that associates the first communiqué with the source entity, the data including at least one of a telephone number, an image, or a voice signature.

\* \* \* \* \*